(12) United States Patent
Surace

(10) Patent No.: US 7,921,965 B1
(45) Date of Patent: Apr. 12, 2011

(54) SOUNDPROOF ASSEMBLY AND METHODS FOR MANUFACTURING SAME

(75) Inventor: Kevin J. Surace, Sunnyvale, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 675 days.

(21) Appl. No.: 10/975,530

(22) Filed: Oct. 27, 2004

(51) Int. Cl.
E04B 1/82 (2006.01)

(52) U.S. Cl. .......... 181/290; 181/294; 181/285; 52/144; 52/145

(58) Field of Classification Search .................. 181/290, 181/285, 294, 287, 210, 288; 52/144, 145
See application file for complete search history.

(56) References Cited

U.S. PATENT DOCUMENTS

| | | |
|---|---|---|
| 2,811,906 A | 11/1957 | Chappell |
| 3,160,549 A | 12/1964 | Caldwell et al. |
| 3,215,225 A | 11/1965 | Kirschner |
| 3,336,710 A * | 8/1967 | Raynes ............ 52/309.11 |
| 3,399,104 A | 8/1968 | Ball, III et al. |
| 3,424,270 A | 1/1969 | Hartman et al. |
| 3,462,899 A | 8/1969 | Sherman |
| 3,579,941 A | 5/1971 | Tibbals |
| 3,642,511 A | 2/1972 | Cohn et al. |
| 3,828,504 A | 8/1974 | Egerborg et al. |
| 4,003,752 A | 1/1977 | Isohata et al. |
| 4,112,176 A | 9/1978 | Bailey |
| 4,156,615 A | 5/1979 | Cukier et al. |
| 4,338,758 A * | 7/1982 | Hagbjer ............ 52/745.2 |
| 4,347,912 A | 9/1982 | Flocke et al. |
| 4,375,516 A | 3/1983 | Barrall |
| 4,487,793 A | 12/1984 | Haines et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |

(Continued)

FOREIGN PATENT DOCUMENTS

CA 2219785 10/1996

(Continued)

OTHER PUBLICATIONS http://web.srchive.org/web/20030702094400/http://ies2000atlanta. com/products31111.htm see attached.*

(Continued)

Primary Examiner — Elvin G Enad
Assistant Examiner — Forrest M Phillips
(74) Attorney, Agent, or Firm — Haynes and Boone, LLP

(57) ABSTRACT

An improved acoustical floor/ceiling, or wall assembly affixed to a support structure, the assembly using laminar panels. A first one of the laminar panels includes a constraining layer of material with a layer viscoelastic glue on the constraining layer and a layer of material of a first composition on the layer of viscoelastic glue. A second one of the laminar panels includes a constraining layer of material with a layer of viscoelastic glue on the constraining layer of material and a layer of material of a composition different than that of the layer of material in the other laminar panel. In one assembly the material in the first laminar panel is cellulose-based material or wood, and the material in the second laminar panel is gypsum board. Constraining layers of material of metal, cellulose-based material, wood and petroleum-based products such as plastic, vinyl or rubber, ceramic, composite are employed.

33 Claims, 24 Drawing Sheets

U.S. PATENT DOCUMENTS

| | | | |
|---|---|---|---|
| 4,759,164 A | 7/1988 | Abendroth et al. | |
| 4,778,028 A | 10/1988 | Staley | |
| 4,786,543 A | 11/1988 | Ferm | |
| 4,924,969 A | 5/1990 | L'Heureux | |
| 4,956,321 A | 9/1990 | Barrall | |
| 4,967,530 A | 11/1990 | Clunn | |
| 5,016,413 A | 5/1991 | Counihan | |
| 5,026,593 A * | 6/1991 | O'Brien | 428/215 |
| 5,033,247 A | 7/1991 | Clunn | |
| 5,063,098 A * | 11/1991 | Niwa et al. | 428/76 |
| 5,110,660 A | 5/1992 | Wolf et al. | |
| 5,125,475 A | 6/1992 | Ducharme et al. | |
| 5,158,612 A | 10/1992 | Savoly et al. | |
| 5,240,639 A | 8/1993 | Diez et al. | |
| 5,256,223 A | 10/1993 | Alberts et al. | |
| 5,258,585 A | 11/1993 | Juriga | |
| 5,334,806 A | 8/1994 | Avery | |
| 5,342,465 A | 8/1994 | Bronowicki et al. | |
| 5,368,914 A | 11/1994 | Barrett | |
| 5,439,735 A | 8/1995 | Jamison | |
| 5,473,122 A | 12/1995 | Kodiyalam et al. | |
| 5,474,840 A | 12/1995 | Landin | |
| 5,502,931 A | 4/1996 | Munir | |
| 5,603,192 A | 2/1997 | Dickson | |
| 5,629,503 A | 5/1997 | Thomasen | |
| 5,643,666 A | 7/1997 | Eckart et al. | |
| 5,664,397 A | 9/1997 | Holz | |
| 5,691,037 A | 11/1997 | McCutcheon et al. | |
| 5,695,867 A | 12/1997 | Saitoh et al. | |
| 5,768,841 A * | 6/1998 | Swartz et al. | 52/281 |
| 5,824,973 A | 10/1998 | Haines et al. | |
| 5,867,957 A | 2/1999 | Holtrop | |
| 5,910,082 A | 6/1999 | Bender et al. | |
| 5,945,208 A * | 8/1999 | Richards et al. | 428/294.7 |
| 5,954,497 A | 9/1999 | Cloud et al. | |
| 6,077,613 A | 6/2000 | Gaffigan | |
| 6,123,171 A | 9/2000 | McNett et al. | |
| 6,213,252 B1 | 4/2001 | Ducharme | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Standgaard | |
| 6,309,985 B1 | 10/2001 | Virnelson et al. | |
| 6,342,284 B1 | 1/2002 | Yu | |
| 6,381,196 B1 | 4/2002 | Hein et al. | |
| 6,389,771 B1 | 5/2002 | Moller | |
| 6,443,256 B1 | 9/2002 | Baig | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,790,520 B1 | 9/2004 | Todd et al. | |
| 6,800,161 B2 | 10/2004 | Takigawa | |
| 6,803,110 B2 | 10/2004 | Drees et al. | |
| 6,815,049 B2 | 11/2004 | Veramasuneni | |
| 6,822,033 B2 | 11/2004 | Yu | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | Deford et al. | |
| 7,041,377 B2 | 5/2006 | Miura et al. | |
| 7,068,033 B2 | 6/2006 | Sellers et al. | |
| 7,181,891 B2 * | 2/2007 | Surace et al. | 52/642 |
| 7,197,855 B2 | 4/2007 | Della Pepa | |
| 2003/0211305 A1 * | 11/2003 | Koval et al. | 428/292.4 |
| 2004/0016184 A1 | 1/2004 | Huebsch et al. | |
| 2004/0168853 A1 | 9/2004 | Gunasekera et al. | |
| 2004/0214008 A1 | 10/2004 | Dobrusky et al. | |
| 2005/0103568 A1 | 5/2005 | Sapoval et al. | |
| 2005/0263925 A1 * | 12/2005 | Heseltine et al. | 264/109 |
| 2006/0048682 A1 | 3/2006 | Wagh et al. | |
| 2006/0057345 A1 * | 3/2006 | Surace et al. | 428/213 |
| 2006/0059806 A1 | 3/2006 | Gosling et al. | |
| 2006/0108175 A1 | 5/2006 | Surace et al. | |
| 2007/0094950 A1 | 5/2007 | Surace et al. | |
| 2007/0107350 A1 | 5/2007 | Surace et al. | |

FOREIGN PATENT DOCUMENTS

| | | |
|---|---|---|
| EP | 1154087 B1 | 11/2001 |
| JP | 09-203153 | 8/1997 |
| WO | WO 96/34261 | 10/1996 |
| WO | WO 97/19033 | 5/1997 |
| WO | WO 00/24690 | 5/2000 |

OTHER PUBLICATIONS

IES 2000 *Dampening and Visocelastic Membranes* (Jul. 2, 2003) Atlanta.com/product (pp. 1-6).

Waybackmachine search results for Jan. 1, 1996-May 3, 2006 (1 page).

Noise and Vibration Control Engineering: *Principles and Applications*, Edited by Leo Beranek and Instvan Ver, Chapter 11, John Wiley & Sons, Inc., 1002, (12 pages).

Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).

"Green Glue is your soundproofing solution and noise reduction material", www.greengluecompany.com (2 pages).

Acoustical: *A Sound Approach to Testing*, www.archest.com/pages (2 pages).

STC—*Sound Transmission Class—Discussion and Use*, www.sota.ca/stc_info.htm (3 pages).

ASTM International, Designation: C 1396/C 1396M-04, *Standard Specification for Gypsum Board* (7 pages).

Barbara C. Lippiatt, National Institute of Standards and Technology. BEES 3.0, "*Building for Environmental and Economic Sustainability* Technical Manual and User Guide", Oct. 2002, (198 pages).

Takada, et al., *Effect in Reducing Floor Impact Noise of Recycled Paper Damper Members*, Bulletin of Tokyo Metropolitan Industrial Technology Research Institute, No. 2 (1999) [certified English translation] (13 pages).

*Architectural Acoustics*, M. David Egan, J. Ross Publishing (Reprint 2007) p. 211; originally published McGraw-Hill, 1988 (5 pages).

Hastings, Mardi C.; Godfrey, Richard; Babcock, G. Madison, *Application of Small Panel Damping Measurements to Larger Walls*, Proc. SPIE vol. 2720, p. 70-76, Smart Structures and Materials 1996: Passive Damping and Isolation (7 pages).

van Vuure, A.W.; Verpoest, I., Ko, F.K., *Sandwich-Fabric Panels As Spacers in a Constrained Layer Structural Damping Application*, Composites Part B 32 (2001) 11-19, Elsevier Science Ltd. (9 pages).

Noise and Vibration Control, Revised Edition, pp. 306-315, Institute of Noise Control Engineering, 1988, Beranek, Leo L. (editor) (9 pages).

Noise and Vibration Control, Chapter Fourteen, *Damping of Panels*, Ungar, Eric E., pp. 434-473, McGraw-Hill, 1971, Beranek, Leo L. (editor) (7 pages).

Noise and Vibration Control Engineering, *Principles and Application*, pp. 466-479, John Wiley & Sons, 1992, Beranek, Leo L. And Ver, Istvan L. (editors) (9 pages).

Nashif, Ahid D.; Jones, David I. G.; Henderson, John P., *Vibration Damping*, pp. 290-305, John Wiley & Sons, 1985 (18 pages).

Architectural Acoustics, Principles and Practice, John Wiley & sons, 1992, Cavanaugh, William J. and Wilkes, Joseph A. (editors) (332 pages).

Fire Resistance Design Manual, Sound Control, Gypsum Association, GA-600-94 ($14^{th}$ Ed.) (107 pages).

Fire Resistance Design Manual, Sound Control, Gypsum Association, GA-600-97 ($15^{th}$ Ed.) (120 pages).

Fire Resistance Design Manual, Sound Control, Gypsum Association, GA-600-2000 ($16^{th}$ Ed.) (139 pages).

Noxon, Arthur M., *The Chain Is As Strong As Its Weakest Link*, An article written for the first Hong Kong HiFi Show, 1993, Translated and Published in Chinese, http://www.acousticsciences.com/articles/chain.htm (7 pages).

*Quiet Lightweight Floor Systems*, Reprint from Sound and Vibration Magazine, Jul. 1992, by David A. Harris, Building & Acoustic Design Consultants (7 pages).

Joyal, Brian, *Constrained-Layer Systems Provide Weight-Efficient, High Level Damping* (4 pages).

Dynamat materials http://web.archive.org/web/20010525113753/www.admteschusa.com/Dynamat.html Jun. 12, 2007, ADM Tech—Dynamic Control (15 pages).

Noise Killer: Pro Damping Compound Materials http://www.tnt-audio.com/clinica/noise.html May 18, 2007, 1998 (3 pages).

Waybackmachine search results for Jan. 1, 1996-Jun. 12, 2007 (1 page).

Frankovich, David, *The Four-Fold Method of Noise and Vibration Control* (8 pages).

Renninger, Jennifer, *Understanding Damping Techniques for Noise and Vibration Control* (8 pages).

Unified Facilities Criteria (UFC) *Noise and Vibration Control*, UFC 3-450-01. May 15, 200, Department of Defense (156 pages).

United States Gypsum, *Architectural and Construction Services, Design Data for Acousticians*, Feb. 1986 (4 pages).

*A Study of Techniques to Increase the Sound of Insulation of Building Elements*, Wyle Laboratories, Prepared for Dept. of Housing and Urban Development, Jun. 1973 (12 pages).

dB-Ply materials Sound Reducing Panels from Greenwood Forest Products, Inc., Apr. 24, 1997 (9 pages).

dB-Rock materials OMNI Products, Inc. (3 pages).

ASC WallDamp materials from Acoustic Sciences Corporation http://web.archive.org/web/20021013031149/www.asc-soundproof.com/index-walldamp... May 18, 2007 (21 pages).

Sounddown Viscoelastic Glue DG-A2, Soundown Corporation (2 pages).

Nordisk Akustik A/S materials, http://web.archive.org/web/200206240933724/www.nordisk-akustik.dk/html_uk/prod03.ht... Jun. 11, 2007 (4 pages).

"*Damping of plate flexural vibrations by means of viscoelastic laminae*" by D. Ross, E.E. Ungar, and E.M. Kerwin—Structural Damping, Section III, ASME, 1959, New York (41 pages).

Vandersall, H. L., "*Intumescent Coating Systems, Their development and Chemistry*" J. Fire & Flammability, vol. 2 (Apr. 1971) pp. 97-140 (45 pages).

English Language Abstract, JP Patent First Publication No. 09-203153, Aug. 5, 1997, (2 pages).

*A Study of Techniques to Increase the Sound of Insulation of Building Elements*, Wyle Laboratories, Prepared for Dept. of Housing and Urban Development, Jun. 1973 (16 pages).

*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).

*Sound Studio Construction on a Budget*, F. Alton Evererst, McGraw-Hill, 1997 (7 pages).

*Wood Handbook/Wood as an Engineering Material*, United States Department of Agriculture, Forest Service, General Technical Report FPL-GTR-113, Mar. 1999 (24 pages).

*Transmission Loss of Plasterboard Walls* by T. D. Northwood, Building Research Note, Division of Building Research, National Research Counsel, Ottawa, Canada (10 pages).

*A Guide to Airborne, Impact, and Structureborne Noise Control in Multifamily Dwellings*, U. S. Department of Housing and Urban Development, Prepared for the National Bureau of Standards, Washington, D. C., Jan. 1963 (5 pages).

*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).

*Dictionary of Architecture & Construction 2200 illustrations*, Third Edition, Edited by Cyril M. Harris, Professor Emeritus of Architecture Columbia University, McGraw-Hill, 2000 (7 pages).

*Dictionary of Engineering Materials*, Harald Keller, Uwe Erb, Wiley-Interscience by John Wiley & Sons, Inc. 2004 (4 pages).

*Chamber Science and Technology Dictionary*, by Professor Peter M. B. Walker, W & R Chambers Ltd and Cambridge University Press, 1988 (3 pages).

\* cited by examiner

QuietRock 530 Serenity 60      FIGURE 1
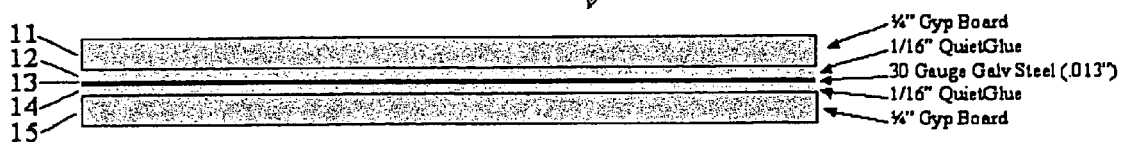
- 11 — ¼" Gyp Board
- 12 — 1/16" QuietGlue
- 13 — 30 Gauge Galv Steel (.013")
- 14 — 1/16" QuietGlue
- 15 — ¼" Gyp Board
QuietRock 7 layer 61      FIGURE 2
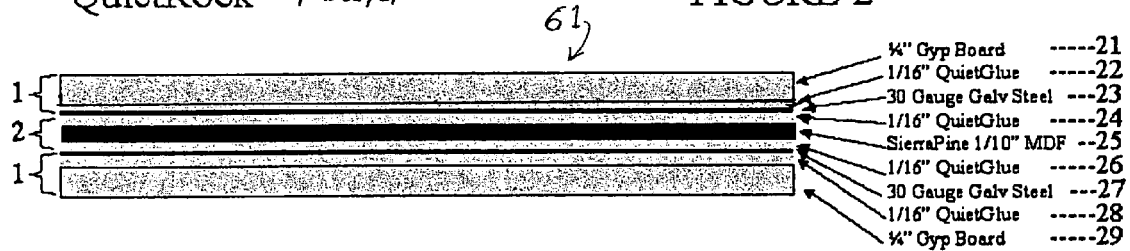
- 21 — ¼" Gyp Board
- 22 — 1/16" QuietGlue
- 23 — 30 Gauge Galv Steel
- 24 — 1/16" QuietGlue
- 25 — SierraPine 1/10" MDF
- 26 — 1/16" QuietGlue
- 27 — 30 Gauge Galv Steel
- 28 — 1/16" QuietGlue
- 29 — ¼" Gyp Board QuietRock 540 Solitude 62↓ FIGURE 3
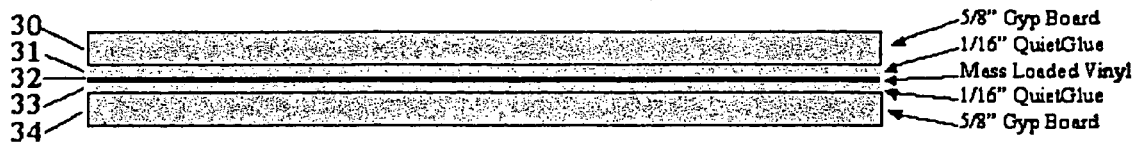
- 30 — 5/8" Gyp Board
- 31 — 1/16" QuietGlue
- 32 — Mass Loaded Vinyl
- 33 — 1/16" QuietGlue
- 34 — 5/8" Gyp Board
QuietWood 640 Solitude 63↓ FIGURE 4
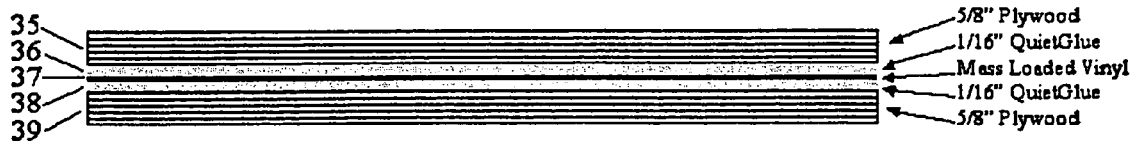
- 35 — 5/8" Plywood
- 36 — 1/16" QuietGlue
- 37 — Mass Loaded Vinyl
- 38 — 1/16" QuietGlue
- 39 — 5/8" Plywood Standard 2x4 construction with QuietWood 640 on both sides - no insulation

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 25 | 31 | 26 | 31 | 34 | 31 | 36 | 42 | 47 | 45 |
| 95% Confidence in dB | 1.42 | 1.92 | 2.07 | 1.47 | 0.89 | 0.76 | 0.80 | 0.52 | 0.36 | 0.38 |
| deficiencies | | | | (2) | (2) | (8) | (6) | (3) | (1) | (4) |

| 1/3 OCT BND CNTR FREQ | 630 | 800 | 1000 | 1250 | 1600 | 2000 | 2500 | 3150 | 4000 | 5000 |
|---|---|---|---|---|---|---|---|---|---|---|
| TL in dB | 47 | 51 | 51 | 53 | 53 | 54 | 55 | 57 | 59 | 58 |
| 95% Confidence in dB | 0.29 | 0.44 | 0.38 | 0.39 | 0.36 | 0.56 | 0.55 | 0.31 | 0.32 | 0.50 |
| deficiencies | (3) | (0) | (1) | (0) | (0) | | | | | |

| EWR | OITC | | STC |
|---|---|---|---|
| 48 | 39 | Specimen Area: 16 sq.ft.<br>Temperature: 73 deg. F<br>Relative Humidity: 56 %<br>Test Date: 05 June 2003 | 49<br>(30) |

Standard 2x4 construction with QuietRock 540 Solitude one side No insulation

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 23 | 25 | 21 | 29 | 38 | 41 | 43 | 40 | 45 | 45 |
| 95% Confidence in dB | 1.42 | 1.92 | 2.07 | 1.47 | 0.89 | 0.76 | 0.80 | 0.52 | 0.36 | 0.38 |
| deficiencies | | | | (3) | | | | (4) | (2) | (3) |
| 1/3 OCT BND CNTR FREQ | 630 | 800 | 1000 | 1250 | 1600 | 2000 | 2500 | 3150 | 4000 | 5000 |
| TL in dB | 47 | 49 | 51 | 51 | 51 | 50 | 48 | 51 | 56 | 56 |
| 95% Confidence in dB | 0.29 | 0.44 | 0.38 | 0.39 | 0.36 | 0.56 | 0.55 | 0.31 | 0.32 | 0.50 |
| deficiencies | (2) | (1) | (0) | (1) | (1) | (2) | (4) | (1) | | |

| EWR | OITC |
|---|---|
| 50 | 36 |

Specimen Area: 16 sq.ft.
Temperature: 73 deg. F
Relative Humidity: 57 %
Test Date: 05 June 2003

| STC |
|---|
| 48 |
| (24) |

Impact sound transmission test according to ASTM E492  
CLIENT: Quiet Solution  
CONTACT : Kevin Surace    Specimen ID: F04009

IIF-04-009

RECEIVING ROOM: M59Lower  
RECEIVING ROOM VOLUME:  176.2 m³  
NICHE DEPTH      0.18 m  
TEMPERATURE:     21.16 deg C  
HUMIDITY:        63.44 %  
SOUND SPEED:     343.9 m/s  
SPECIMEN AREA :  17.85 m²  
SPECIMEN CODE :QW63128_WT457(610)_QR53016  
28mm QuietWood / 457mm Wood Trusses 610 mm oc / 16mm QuietRock  
NOTES :  
A second base assembly was built the same as assembly F04010. No insulation.  
QuietWood joints are sealed with QuietSeal. QuietRock joints are sealed with  
QuietSeal and covered with tape.

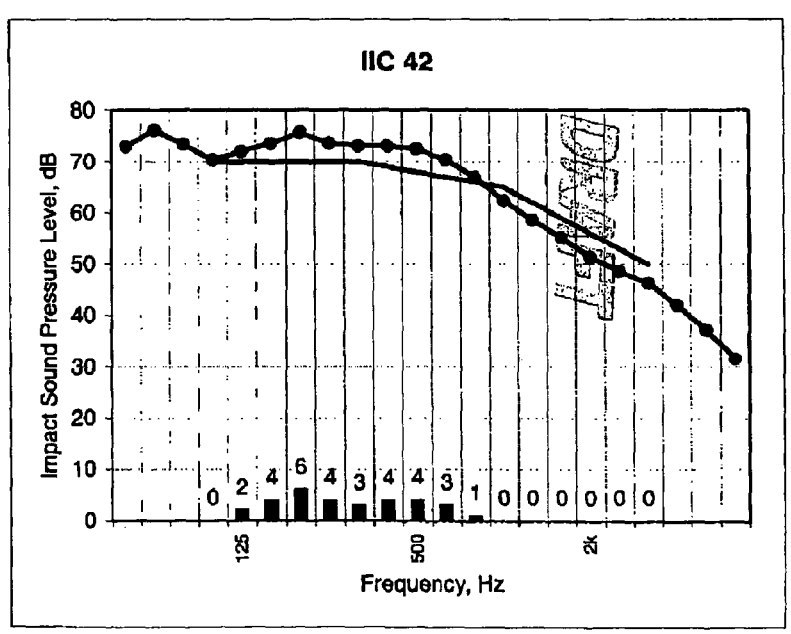

| Freq | NISPL |
|---|---|
| 25 | 86.1 |
| 32 | 85.1 |
| 40 | 69.9 |
| 50 | 73.0 |
| 63 | 76.2 |
| 80 | 73.4 |
| 100 | 70.3 |
| 125 | 72.0 |
| 160 | 73.5 |
| 200 | 75.6 |
| 250 | 73.6 |
| 315 | 73.1 |
| 400 | 73.1 |
| 500 | 72.5 |
| 630 | 70.3 |
| 800 | 67.0 |
| 1000 | 62.3 |
| 1250 | 58.6 |
| 1600 | 55.1 |
| 2000 | 51.4 |
| 2500 | 48.7 |
| 3150 | 46.4 |
| 4000 | 42.1 |
| 5000 | 37.3 |
| 6300 | 31.6 |
| $L_{n,w}$ | 68 |

FIGURE 14

Sound transmission Loss test according to ASTM E90

CLIENT: Quiet Solution
CONTACT : Kevin Surace    Specimen ID: F04009

SPECIMEN AREA : 17.85 m²

SPECIMEN CODE :QW63128_WT457(610)_QR53016
28mm QuietWood / 457mm Wood Trusses 610 mm oc / 16mm QuietRock
NOTES :
A second base assembly was built the same as assembly F04010. No insulation.
QuietWood joints are sealed with QuietSeal. QuietRock joints are sealed with
QuietSeal and covered with tape.

TLF-04-016
TLF-04-015

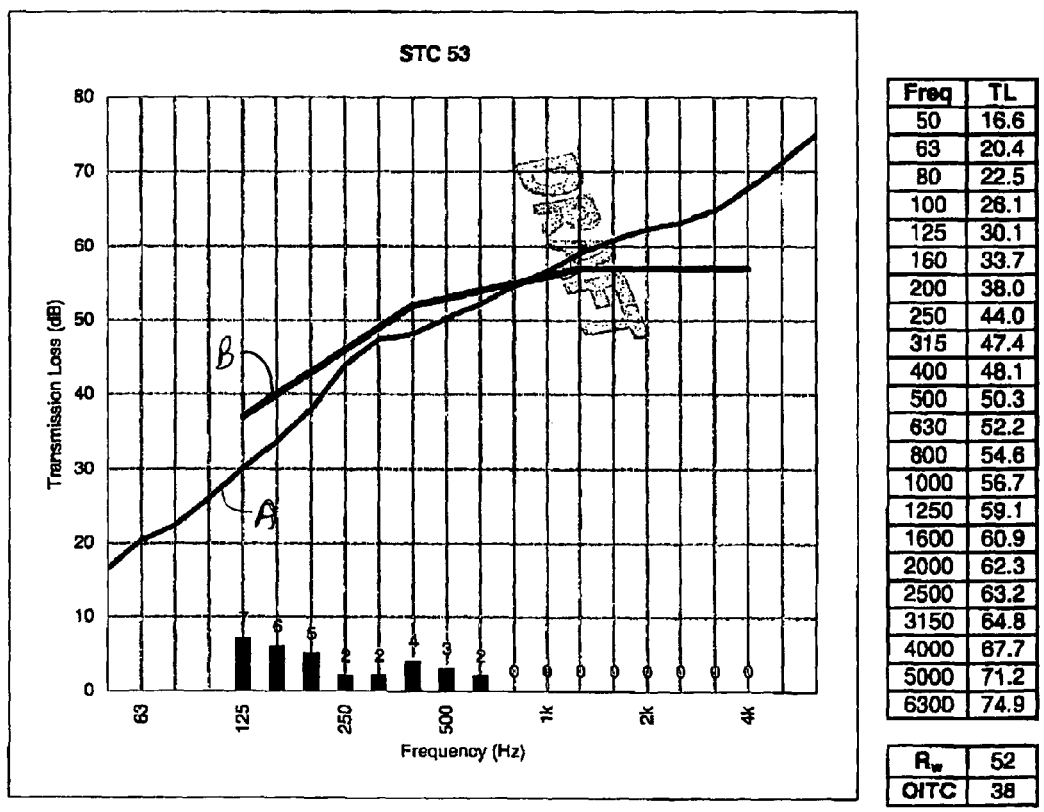

| Freq | TL |
|---|---|
| 50 | 16.6 |
| 63 | 20.4 |
| 80 | 22.5 |
| 100 | 26.1 |
| 125 | 30.1 |
| 160 | 33.7 |
| 200 | 38.0 |
| 250 | 44.0 |
| 315 | 47.4 |
| 400 | 48.1 |
| 500 | 50.3 |
| 630 | 52.2 |
| 800 | 54.6 |
| 1000 | 56.7 |
| 1250 | 59.1 |
| 1600 | 60.9 |
| 2000 | 62.3 |
| 2500 | 63.2 |
| 3150 | 64.8 |
| 4000 | 67.7 |
| 5000 | 71.2 |
| 6300 | 74.9 |

| $R_w$ | 52 |
|---|---|
| OITC | 38 |

Tested by ........    Checked by ........

FIGURE 15

Impact sound transmission test according to ASTM E492  IIF-04-010
CLIENT: Quiet Solution
CONTACT : Kevin Surace    Specimen ID: F04011

RECEIVING ROOM: M59Lower
RECEIVING ROOM VOLUME:       176.2 m³
NICHE DEPTH                  0.18 m
TEMPERATURE:                 21.5 deg C
HUMIDITY:                    59.21 %
SOUND SPEED:                 344.1 m/s
SPECIMEN AREA :              17.85 m²
SPECIMEN CODE :CAR_UNDERLAY9_QW63128_WT457(610)_QR53016
Carpet / 9mm Underlayment / 28mm QuietWood / 457mm Wood Trusses 610 mm oc
/ 16mm QuietRock
NOTES :
NRC carpet and underlayment laid down on QuietWood. Base assembly F04009 used
for this test. No insulation. Screw spacing is 305mm oc. on ceiling. QuietWood
joints are sealed with QuietSeal. QuietRock joints are sealed with QuietSeal
and covered with tape.

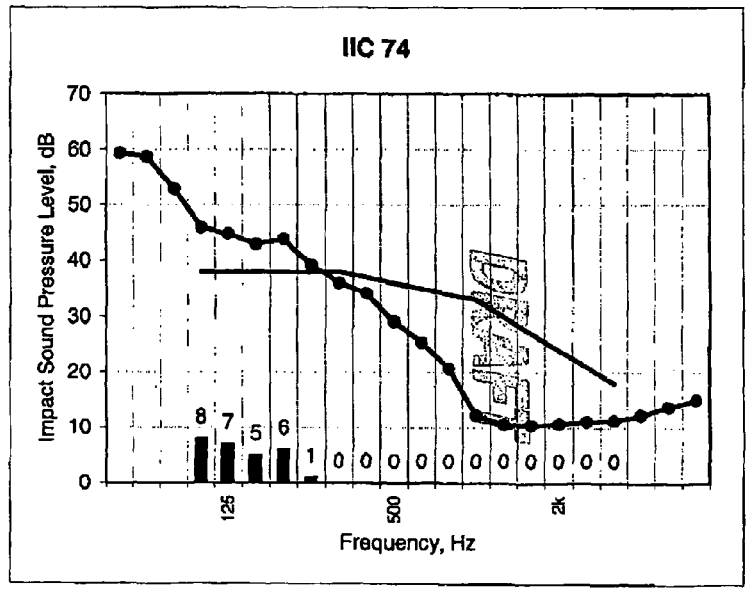

| Freq | NISPL |
|------|-------|
| 25   | 77.6  |
| 32   | 78.2  |
| 40   | 60.6  |
| 50   | 59.3  |
| 63   | 58.8  |
| 80   | 52.9  |
| 100  | 45.9  |
| 125  | 44.8  |
| 160  | 43.0  |
| 200  | 43.8  |
| 250  | 39.2  |
| 315  | 36.0  |
| 400  | 34.1  |
| 500  | 29.1  |
| 630  | 25.3  |
| 800  | 20.7  |
| 1000 | 12.2  |
| 1250 | 10.6  |
| 1600 | 10.5  |
| 2000 | 10.7  |
| 2500 | 11.1  |
| 3150 | 11.3  |
| 4000 | 12.3  |
| 5000 | 13.7  |
| 6300 | 15.0  |

Sound transmission Loss test according to ASTM E90

CLIENT: Quiet Solution
CONTACT : Kevin Surace    Specimen ID: F04011

SPECIMEN AREA :   17.85 m²

SPECIMEN CODE :CAR_UNDERLAY9_QW63128_WT457(610)_QR53016
Carpet / 9mm Underlayment / 28mm QuietWood / 457mm Wood Trusses 610 mm oc
/ 16mm QuietRock
NOTES :
NRC carpet and underlayment laid down on QuietWood. Base assembly F04009 used for this test. No insulation. QuietWood joints are sealed with QuietSeal.
QuietRock joints are sealed with QuietSeal and covered with tape.

TLF-04-018
TLF-04-017

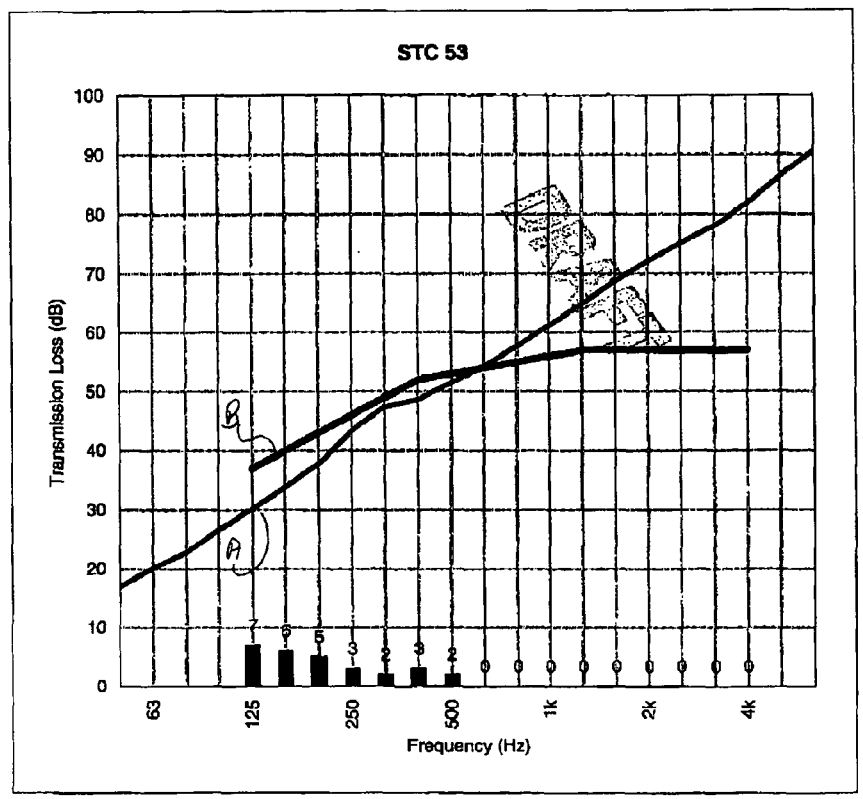

FIGURE 17

Impact sound transmission test according to ASTM E492        IIF-04-011
CLIENT: Quiet Solution
CONTACT : Kevin Surace        Specimen ID: F04012

RECEIVING ROOM: M59Lower
RECEIVING ROOM VOLUME:        176.4 m³
NICHE DEPTH                    0.19 m
TEMPERATURE:                   21.72 deg C
HUMIDITY:                      58.28 %
SOUND SPEED:                   344.2 m/s
SPECIMEN AREA :                17.85 m²
SPECIMEN CODE :PARQ27_UNDERLAY9_QW63128_WT457(610)_QR53016
27mm Parquet / 9mm Underlayment / 28mm QuietWood / 457mm Wood Trusses 610 mm oc / 16mm QuietRock
NOTES :
NRC parquet topping installed on Quiet Solution Quiet Foam™ underlayment which is
laid down on the QuietWood. Perimeter sealed with tape. Base assembly F04010 used for this test.
No insulation. Screw spacing is 305mm oc.on ceiling. QuietWood joints are sealed with QuietSeal.
QuietRock joints are sealed with QuietSeal and covered with tape.

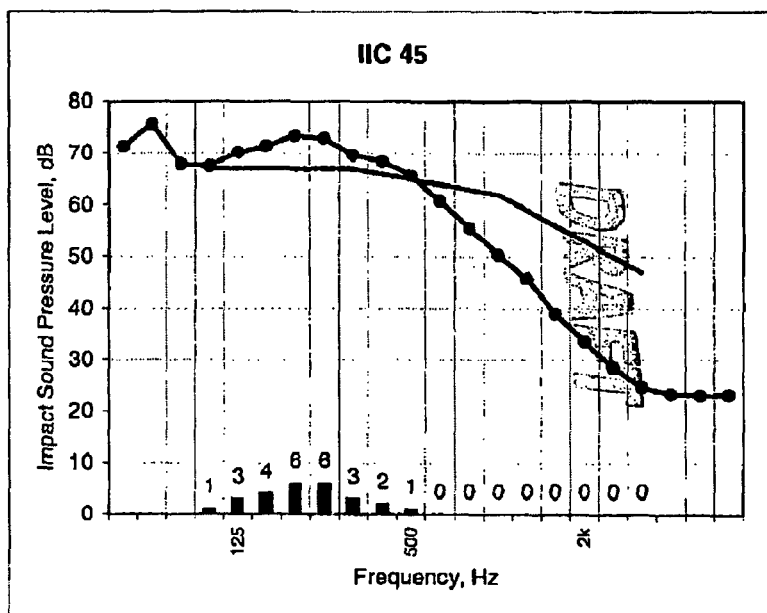

| Freq | NISPL |
|------|-------|
| 25   | 84.9  |
| 32   | 88.9  |
| 40   | 67.9  |
| 50   | 71.3  |
| 63   | 75.7  |
| 80   | 68.0  |
| 100  | 67.5  |
| 125  | 70.2  |
| 160  | 71.4  |
| 200  | 73.4  |
| 250  | 72.8  |
| 315  | 69.7  |
| 400  | 68.4  |
| 500  | 65.7  |
| 630  | 60.8  |
| 800  | ..    |
| 1000 | 50.3  |
| 1250 | 45.6  |
| 1600 | 39.0  |
| 2000 | 33.6  |
| 2500 | 28.5  |
| 3150 | 24.8  |
| 4000 | 23.5  |
| 5000 | 23.2  |
| 6300 | 23.4  |

Sound transmission Loss test according to ASTM E90

TLF-04-020
TLF-04-019

CLIENT: Quiet Solution
CONTACT : Kevin Surace          Specimen ID: F04012

SPECIMEN AREA :    17.85 m²

SPECIMEN CODE :PARQ27_UNDERLAY9_QW63128_WT457(610)_QR53016
27mm Parquet / 9mm Underlayment / 28mm QuietWood / 457mm Wood Trusses 610 mm oc / 16mm QuietRock
NOTES :
NRC parquet topping installed on the Quiet Solution QuietFoam underlayment which is laid down on the QuietWood. Perimeter sealed with tape. Base assembly F04010 used for this test. No insulation. Screw spacing is 305mm oc. on ceiling. QuietWood joints are sealed with QuietSeal. QuietRock joints are sealed with QuietSeal and covered with tape.
          0
          0
          0
          0

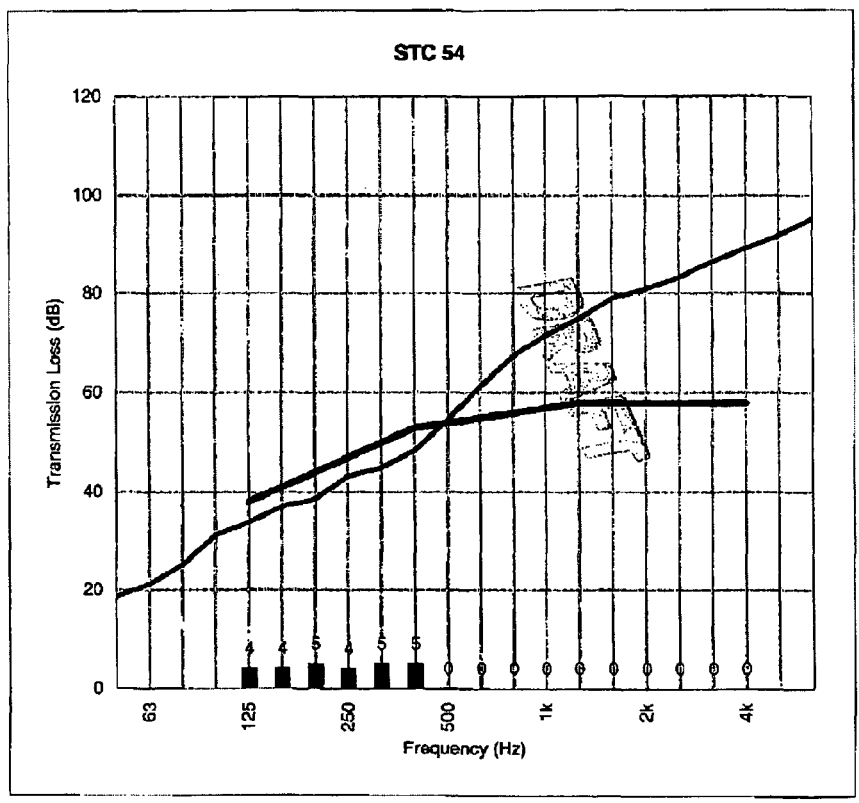

| Freq | TL |
|------|------|
| 50 | 18.6 |
| 63 | 21.2 |
| 80 | 25.1 |
| 100 | 31.2 |
| 125 | 33.8 |
| 160 | 37.0 |
| 200 | 38.6 |
| 250 | 43.2 |
| 315 | 44.9 |
| 400 | 48.5 |
| 500 | 54.6 |
| 630 | 61.3 |
| 800 | 67.4 |
| 1000 | 71.6 |
| 1250 | 74.9 |
| 1600 | 79.0 |
| 2000 | 80.9 |
| 2500 | 83.3 |
| 3150 | 86.4 |
| 4000 | 89.1 |
| 5000 | 91.8 |
| 6300 | 95.3 |

| | |
|---|---|
| $R_w$ | 54 |
| OITC | 41 |

Tested by  /S      Checked by  AF

FIGURE 19

Impact sound transmission test according to ASTM E492  IIF-04-012
CLIENT: Quiet Solution
CONTACT : Kevin Surace    Specimen ID: F04013

RECEIVING ROOM: M59Lower
RECEIVING ROOM VOLUME: 176.4 m³
NICHE DEPTH 0.19 m
TEMPERATURE: 21.88 deg C
HUMIDITY: 55.84 %
SOUND SPEED: 344.3 m/s
SPECIMEN AREA : 17.85 m²
SPECIMEN CODE :Hardwood9_OSB11_Foam9_QW63128_WT457(610)_QR53016
9mm Hardwood / 11mm OSB / 9mm Quiet Foam / 28mm QuietWood / 457mm Wood Trusses 610 mm oc / 16mm QuietRock
NOTES :
Hardwood floor was nailed down with finishing nails to the OSB. OSB was laid down on the Quiet Foam. Quiet Solution Quiet Foam - is laid down on the QuietWood. Base assembly F04010 used for this test. No insulation. Screw spacing is 305mm oc. on ceiling. QuietWood joints are sealed with QuietSeal. QuietRock joints are sealed with QuietSeal and covered with tape.

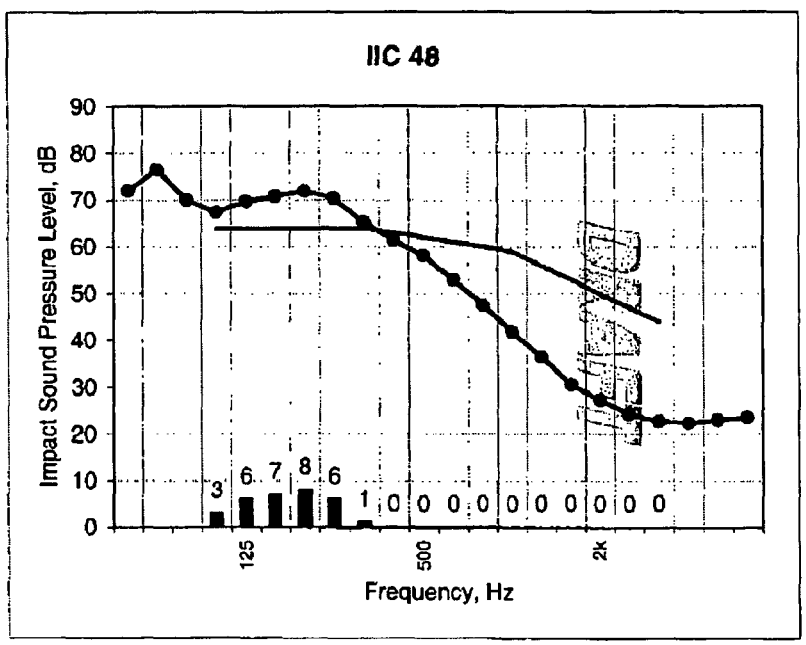

| Freq | NISPL |
|---|---|
| 25 | 85.8 |
| 32 | 90.0 |
| 40 | 68.7 |
| 50 | 72.0 |
| 63 | 76.5 |
| 80 | 70.0 |
| 100 | 67.4 |
| 125 | 69.7 |
| 160 | 70.9 |
| 200 | 71.9 |
| 250 | 70.3 |
| 315 | 65.2 |
| 400 | 61.4 |
| 500 | 58.2 |
| 630 | 53.1 |
| 800 | 47.5 |
| 1000 | 41.8 |
| 1250 | 36.6 |
| 1600 | 30.5 |
| 2000 | 27.3 |
| 2500 | 24.3 |
| 3150 | 22.7 |
| 4000 | 22.4 |
| 5000 | 23.0 |
| 6300 | 23.6 |

Sound transmission Loss test according to ASTM E90

TLF-04-022
TLF-04-021

CLIENT: Quiet Solution
CONTACT : Kevin Surace          Specimen ID: F04013

SPECIMEN AREA :   17.85 m²

SPECIMEN CODE :Hardwood9_OSB11_Foam9_QW63128_WT457(610)_QR53016
9mm Hardwood / 11mm OSB / 9mm Quiet Foam / 28mm QuietWood / 457mm Wood Trusses 610 mm oc
/ 16mm QuietRock
NOTES :
Hardwood floor was nailed down with finishing nails to the OSB. OSB was laid
down on the Quiet Foam. Quiet Solution Quiet Foam - is laid down on
the QuietWood. Base assembly F04010 used for this test. No insulation. Screw
spacing is 305mm oc. on ceiling. QuietWood joints are sealed with QuietSeal,
QuietRock joints are sealed with QuietSeal and covered with tape.
0
0

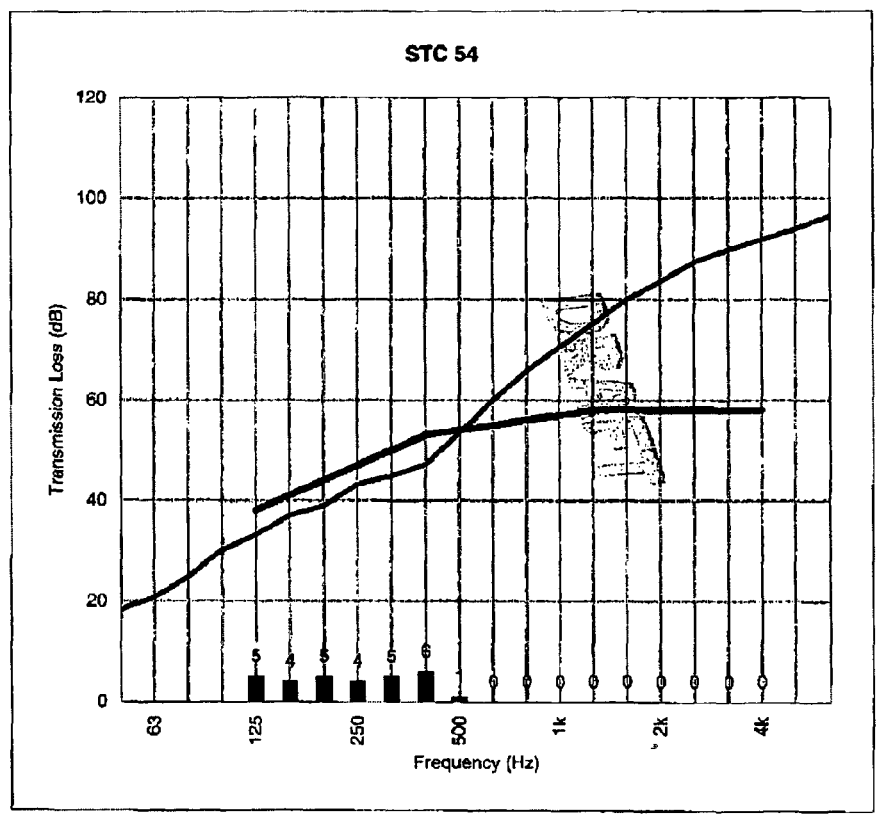

| Freq | TL |
|------|------|
| 50 | 18.5 |
| 63 | 20.9 |
| 80 | 24.8 |
| 100 | 30.2 |
| 125 | 33.1 |
| 160 | 36.9 |
| 200 | 38.9 |
| 250 | 43.2 |
| 315 | 44.8 |
| 400 | 47.2 |
| 500 | 53.3 |
| 630 | 60.0 |
| 800 | 65.8 |
| 1000 | 70.6 |
| 1250 | 75.2 |
| 1600 | 80.0 |
| 2000 | 83.6 |
| 2500 | 87.3 |
| 3150 | 89.8 |
| 4000 | 91.8 |
| 5000 | 93.9 |
| 6300 | 96.6 |

| $R_w$ | 53 |
|------|------|
| OITC | 41 |

Tested by ____    Checked by ____

FIGURE 21

Impact sound transmission test according to ASTM E492　　　　IIF-04-014
CLIENT: Quiet Solution
CONTACT : Kevin Surace　　　Specimen ID: F04015

RECEIVING ROOM: M59Lower
RECEIVING ROOM VOLUME:　　　　176 m³
NICHE DEPTH　　　　　　　　　　0.17 m
TEMPERATURE:　　　　　　　　　22.29 deg C
HUMIDITY:　　　　　　　　　　　60.78 %
SOUND SPEED:　　　　　　　　　344.6 m/s
SPECIMEN AREA :　　　　　　　　17.85 m²
SPECIMEN CODE :Hardwood9_OSB11_Foam9_QW63128_WT457(610)_GFB241_WFUR19(610)_QR5301(
9mm Hardwood / 11mm OSB / 9mm Quiet Foam / 28mm QuietWood / 457mm Wood Trusses 610 mm oc
/ 241mm Glass Fibre Batts / 19mm Wood Furring 610 mm oc / 16mm QuietRock
NOTES :
Hardwood floor was nailed down with finishing nails to the OSB. OSB was laid
down on the Quiet Foam. Quiet Solution Quiet Foam - is laid down on
the QuietWood. Base assembly F04010 used for this test. R31 insulation.
QuietRock is installed parallel to the trusses. Screw spacing is 305mm oc. on
ceiling. QuietWood joints are sealed with QuietSeal. QuietRock joints are
sealed with QuietSeal and covered with tape. Wood furring strips installed at
610mm oc.

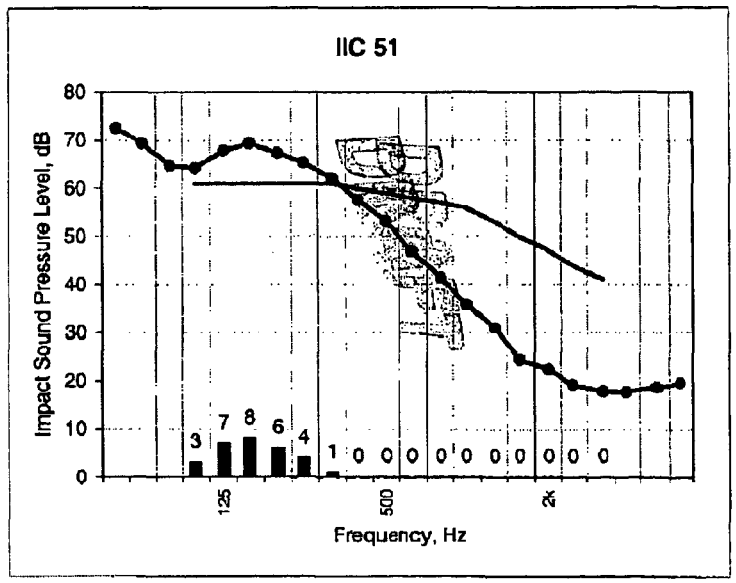

| Freq | NISPL |
|------|-------|
| 25   | 83.0  |
| 32   | 84.7  |
| 40   | 66.3  |
| 50   | 72.5  |
| 63   | 69.6  |
| 80   | 64.8  |
| 100  | 64.3  |
| 125  | 67.9  |
| 160  | 69.5  |
| 200  | 67.4  |
| 250  | 65.3  |
| 315  | 62.2  |
| 400  | 57.7  |
| 500  | 53.2  |
| 630  | 46.9  |
| 800  | 41.3  |
| 1000 | 35.8  |
| 1250 | 30.9  |
| 1600 | 24.5  |
| 2000 | 22.4  |
| 2500 | 19.2  |
| 3150 | 17.8  |
| 4000 | 17.7  |
| 5000 | 18.7  |
| 6300 | 19.6  |

Sound transmission Loss test according to ASTM E90

TLF-04-026
TLF-04-025

CLIENT: Quiet Solution
CONTACT : Kevin Surace     Specimen ID: F04015

SPECIMEN AREA :   17.85 m$^2$

SPECIMEN CODE :Hardwood9_OSB11_Foam9_QW63128_WT457(610)_GFB241_WFUR19(610)_QR53016
9mm Hardwood / 11mm OSB / 9mm Quiet Foam / 28mm QuietWood / 457mm Wood Trusses 610 mm oc
/ 241mm Glass Fibre Batts / 19mm Wood Furring 610 mm oc / 16mm QuietRock
NOTES :
Hardwood floor was nailed down with finishing nails to the OSB. OSB was laid
down on the Quiet Foam. Quiet Solution Quiet Foam - is laid down on
the QuietWood. Base assembly F04010 used for this test. R31 Insulation.
QuietRock is installed parallel to the trusses. Screw spacing is 305mm oc. on
ceiling. QuietWood joints are sealed with QuietSeal. QuietRock joints are
sealed with QuietSeal and covered with tape. Wood furring strips installed at
610mm oc.

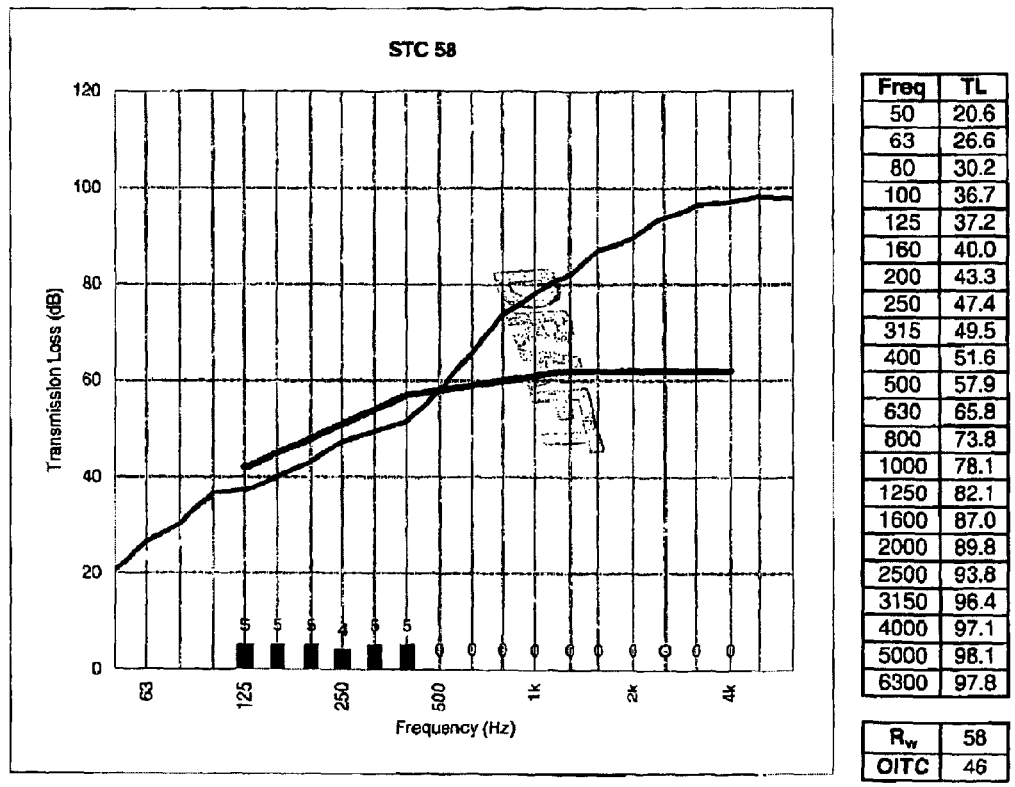

| Freq | TL |
|---|---|
| 50 | 20.6 |
| 63 | 26.6 |
| 80 | 30.2 |
| 100 | 36.7 |
| 125 | 37.2 |
| 160 | 40.0 |
| 200 | 43.3 |
| 250 | 47.4 |
| 315 | 49.5 |
| 400 | 51.6 |
| 500 | 57.9 |
| 630 | 65.8 |
| 800 | 73.8 |
| 1000 | 78.1 |
| 1250 | 82.1 |
| 1600 | 87.0 |
| 2000 | 89.8 |
| 2500 | 93.8 |
| 3150 | 96.4 |
| 4000 | 97.1 |
| 5000 | 98.1 |
| 6300 | 97.8 |

| R$_w$ | 58 |
|---|---|
| OITC | 46 |

Tested by _____     Checked by _____

FIGURE 23

SOUNDPROOF ASSEMBLY AND METHODS FOR MANUFACTURING SAME

CROSS REFERENCE TO RELATED APPLICATION(S)

This application is related to commonly assigned U.S. patent application Ser. No. 10/658,814 filed Sep. 8, 2003, by Kevin J. Surace and Marc U. Porat, entitled "Accoustical Sound Proofing Material and Methods for Manufacturing Same", and U.S. patent application Ser. No. 10/938,051 filed Sep. 10, 2004, by Kevin J. Surace and Marc U. Porat, entitled "Acoustical Sound Proofing Material and Methods for Manufacturing Same," both of which are incorporated by reference herein in their entirety.

FIELD OF THE INVENTION

This invention relates to acoustical damping materials and, in particular, to soundproofing materials of a novel laminar construction which significantly improves the soundproofing ability of walls, ceilings, floors, and doors, thereby to prevent the transmission of sounds from one area to another.

BACKGROUND OF THE INVENTION

Noise is emerging as both an economic and public policy issue. Soundproof rooms are required for a variety of purposes. For example, apartments, hotels and schools all require rooms with walls, ceilings and floors that minimize the transmission of sound thereby to avoid annoying people in adjacent rooms. Soundproofing is particularly important in buildings adjacent to public transportation, such as highways, airports and railroad lines, as well as theaters, home theaters, music practice rooms, recording studios and others. One measure of the severity of the problem is the widespread emergence of city building ordinances that specify minimum Sound Transmission Class ("STC") and Impact Insulation Class (IIC) ratings. Another measure is the broad emergence of litigation between homeowners and builders over the issue of unacceptable noise. To the detriment of the U.S. economy, both problems have resulted in major builders refusing to build homes, condos and apartments in certain municipalities; and in widespread cancellation of liability insurance for builders.

In the past, walls typically were made up of studs with drywall on both exterior surfaces of the studs and baffles or plates commonly placed between the studs in an attempt to reduce the transmission of sound from one room to the next. Unfortunately, even the best of such walls using standard drywall are capable of only reducing sound transmission by approximately 30 db, and much of that is focused on mid-range and high frequencies rather than lower frequencies which cause most of the complaints and litigation.

Various techniques and products have emerged to abate this problem, such as: replacement of wooden studs by steel studs; resilient channels to offset and isolate drywall panels from studs; mass-loaded vinyl barriers; cellulose soundboard; cellulose and fiberglass batt insulation; and techniques such as staggered-beam and double-beam construction. All help reduce the transmission of noise, but, again, not to such an extent that certain sounds (e.g., lower frequencies, high decibel) in a given room are prevented from being transmitted to an adjacent room, including rooms above or below. A brief review of commercially available products shows that there has been little innovation in these techniques and technologies for many years.

Floor/ceiling assemblies which are typically second floor, third floor, fourth floor have traditionally been constructed with gypsum wall board (GWB) or drywall on the ceiling below which is attached to a resilient channel (RC). The resilient channel could be attached to the joists, of the floor. These joists could be standard wood planks, trusses, wood I-beam, or other engineered joist system. The joists can range from a few inches to eighteen or twenty-four inches in depth. The space between the joists may or may not be filled with insulation. Traditionally a sub-floor is placed above the joists and a light-weight concrete or gypsum concrete material is poured on top of the sub-floor for acoustic and leveling reasons. The term light-weight concrete is used herein as a generic description for a concrete topping that is less dense than standard concrete. There are a number of significant disadvantages with light-weight concrete. Firstly, even though it is referred to as "light-weight" it is still very heavy, and you have to bring in separate sub-contractors. Secondly it leaves a lot of water in the building, which can cause mold which is a leading liability issue. Thirdly, while light-weight concrete helps to improve the STC rating it may often decrease the IIC rating. To counteract the IIC problem, a resilient acoustical underlayment is installed between the light-weight concrete and the subfloor. The underlayment is installed to reduce tapping noise from people walking across the floor. If underlayment is installed before the light-weight concrete is applied, the underlayment is extended up the walls to try to avoid getting the wet light-weight concrete on the installed drywall because it may cause mold. Then a second sub-floor is installed on the light-weight concrete and then a hardwood floor is installed over this second sub-floor. Thus a set of very complex operations have to be performed.

Accordingly, what is needed is a new floor/ceiling structure and a new floor/ceiling method of construction to reduce the transmission of sound from one room to an adjacent room.

SUMMARY OF THE INVENTION

A structure in accordance with the present invention significantly simplifies the construction of a floor/ceiling structure and in addition significantly reduces sound transmission from adjacent living spaces. In the embodiment described, the structure is aligned such that it provides for sound reduction in a vertical direction, however the structure of the present invention could be used to reduce sound transmission, in the form of flanking noise, from one space to another in the horizontal direction.

In accordance with the invention, a first laminar panel and a second laminar panel are utilized and are supported by structures such as joist, I beam or truss structures which are typically used between a floor and ceiling construction. A first laminar panel is placed on the support structure and secured to the structure and a second laminar panel having layers which are of a different composition than layers in the first laminar panel is secured to the support structure on the opposite side from the first panel. In one embodiment, one laminar panel may be constructed of a material having a layer of a selected thickness of gypsum board. In another embodiment, one of the laminar panels may be constructed using a layer of a cellulose-based material or alternatively wood.

In another embodiment, one of the laminar panels includes a second layer of a selected thickness gypsum board. In providing for a sound transmission reduction, a layer of viscoelastic glue is placed on one surface of a layer of the panel and a constraining layer of material is placed on the exposed surface of the viscoelastic glue.

In one embodiment a floor is constructed utilizing a constraining layer having viscoelastic glue positioned on opposite sides, and first and second layers of a cellulose based material or wood are positioned on the outer surfaces of the layers of the viscoelastic glue. In the context of a floor, this simple construction replaces the multiple layers described above that have been used in the prior art. This significantly reduces the costs and the number of different trades that are required to install a floor assembly. The wood, glue, constraining layer, glue, and additional wood layer may be secured to the floor-to-ceiling support structure by, for example, nailing the laminar panel to the joists. In one embodiment, the constraining layer may be mass loaded vinyl and in another embodiment, the constraining layer may be metal.

In a further embodiment of the present invention, the ceiling portion of the floor to ceiling construction may utilize gypsum board structures as the outer layers of a laminar panel. Between the outer layers of gypsum board is provided a constraining layer of material having a layer of viscoelastic glue on each side. The constraining layer and the first and second layers of viscoelastic glue are sandwiched between the outer layers of gypsum board. This laminar structure may be nailed directly to the support structure. In one embodiment the constraining layer may be metal. In another embodiment the constraining layer may be a layer of vinyl, plastic composite, or rubber, ceramic or other composite.

In a further embodiment, if additional sound deadening is desirable, a plurality of constraining layers may be provided internally of the outer layers of the laminar panel. For example, first, second and third constraining layers may be provided, each having a layer of viscoelastic glue on opposite sides. The internal constraining layers are then sandwiched between the outer layers.

In accordance with a further aspect of the present invention, a method of manufacturing a soundproof assembly is provided. In this method, a first laminar panel is secured to a support structure at one location, and a second laminar panel is secured to the support structure at a position opposite the first laminar panel. For example the first laminar panel may be a ceiling structure and the second laminar panel be a floor structure which is above the first laminar panel. A support structure provides the intervening structure to support the ceiling and the floor above it. In this method, the act of providing the first laminar panel comprises providing a laminar panel which includes a constraining layer of material, a first layer of viscoelastic glue positioned on a surface of the first constraining layer of material and a first layer of material having a first composition placed on the exposed surface of the first layer of viscoelastic glue. Providing a second laminar panel comprises providing a laminar panel having a second constraining layer of material, a second layer of viscoelastic glue positioned on the exposed surface of the second constraining layer of material and providing on the exposed surface of the viscoelastic glue a second layer of material having a second composition which is different than the composition of the first layer of material in the first laminar panel.

In one embodiment, the method includes construction of a first laminar panel with the first layer of material which is positioned on a surface of the viscoelastic glue being a layer of material selected from the group of materials such as a cellulose-based material and wood.

In another embodiment, the first laminar panel includes another layer of viscoelastic glue on the first constraining layer of material and a third layer of material positioned on the third layer of viscoelastic glue. In this embodiment, the first layer of material and second layer of material may be a cellulose-based material or wood.

In another embodiment, the soundproof assembly is constructed by providing one laminar panel which includes a constraining layer of material, a layer of viscoelastic glue and a layer of material which is cellulose-based material or wood and providing a second laminar panel which includes a constraining layer of material, a layer of viscoelastic glue and a third layer of gypsum board. The first laminar panel is attached to one side of a support structure and the second laminar panel is attached to another side of the support structure.

In some embodiments, the laminar panels include a constraining layer of a metal such as a sheet metal layer or a layer of galvanized steel. In other embodiments the constraining layer is vinyl, plastic composite or rubber, ceramic, or other composite.

DETAILED DESCRIPTION OF THE DRAWINGS

This invention will be more fully understood in light of the following drawings taken together with the following detailed description.

FIG. 1 shows one embodiment of a laminar structure which can be used in practicing the present invention.

FIG. 2 shows a second embodiment of a laminar structure which contains nine (9) layers of material and which can be used in constructing a soundproof assembly of the present invention.

FIGS. 3 and 4 show alternative embodiments of laminar panels which can be used in a soundproof assembly of the present invention.

FIGS. 14-23 show sound attenuation and impact insulation test results for floor/ceiling assemblies shown in FIGS. 13, and 24-27.

DETAILED DESCRIPTION

Figure 5:
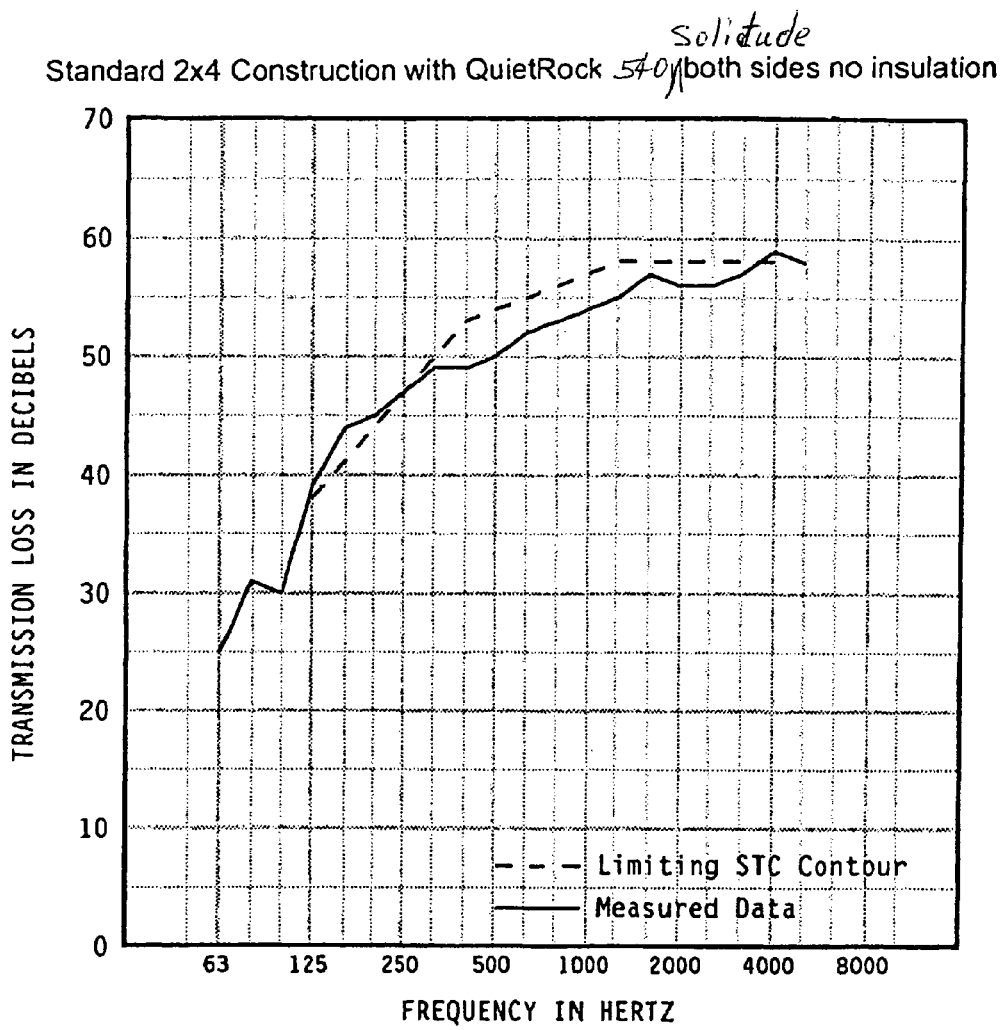
FIGS. 5-10 show sound attenuation test results on several laminar panels described herein.

The following detailed description is meant to be exemplary only and not limiting. Other embodiments of this invention, such as the number, type, thickness and placement order of both external and internal layer materials, will be obvious to those skilled in the art in view of this description.

The process for creating such laminar panels takes into account many factors: exact chemical composition of the glue; various symmetric and non-symmetric thicknesses of glue and layered material; pressing process; drying and dehumidification process.

FIG. 1 shows a laminar panel 60. In FIG. 1, the layers in the structure will be described from top to bottom with the structure oriented horizontally as shown. It should be understood, however, that laminar panel 60 will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical use of this structure. In FIG. 1, the top layer 11 is made up of a standard gypsum material and in one embodiment is ¼ inch thick. Of course, many other combinations and thicknesses can be used for any of the layers as desired. The thicknesses are limited only by the acoustical attenuation (i.e., STC rating) desired for the resulting laminar structure and by the weight of the resulting structure which will limit the ability of workers to install the laminar layer on walls, ceilings, floors and doors for its intended use.

The gypsum board in top layer 11 typically is fabricated using standard well-known techniques and thus the method for fabricating the gypsum board will not be described. Next, on the bottom of the gypsum board 11 is a layer of glue 12 called "QuietGlue™" adhesive. Glue 12, made of a unique viscoelastic polymer, has the property that the energy in the sound and vibration which strikes the glue, when constrained by surrounding layers, will be significantly absorbed by the glue thereby reducing the sound and vibration's amplitude across a broad frequency spectrum, and thus the energy of sound which will transmit through the resulting laminar structure. Typically, this glue is made of the materials as set forth in TABLE 1, although other glues having the characteristics set forth directly below Table 1 can also be used in this invention.

TABLE 1

Quiet Glue ™ Adhesive Chemical Makeup

| Component | WEIGHT % Min | WEIGHT % Max |
|---|---|---|
| Acetaldehyde | 0.00001% | 0.00010% |
| acrylate polymer | 33.00000% | 65.00000% |
| Acrylonitrile | 0.00001% | 0.00100% |
| Ammonia | 0.00100% | 0.01000% |
| bis (1-hydroxy-2-pyridinethionato) Zinc | 0.01000% | 0.10000% |
| Butyl acrylate | 0.00100% | 0.10000% |
| Butyl acrylate, methyl methacrylate, styrene, methacrylic acid 2-hydroxyethyl acrylate polymer | 5.00000% | 15.00000% |
| CI Pigment Yellow 14 | 0.01000% | 0.02000% |
| Ethyl acrylate | 0.00001% | 0.00010% |
| Ethyl acrylate, methacrylic acid, polymer with ethyl-2-propenoate | 1.00000% | 5.00000% |
| Formaldehyde | 0.00100% | 0.01000% |
| hydrophobic silica | 0.00100% | 0.01000% |
| paraffin oil | 0.10000% | 1.00000% |
| polymeric dispersant | 0.00100% | 0.01000% |
| potassium tripolyphosphate | 0.00000% | 0.00200% |
| Silicon dioxide | 0.00100% | 0.10000% |
| sodium carbonate | 0.01000% | 0.10000% |
| Stearic acid, aluminum salt | 0.00100% | 0.10000% |
| Surfactant | 0.00100% | 0.10000% |
| Vinyl acetate | 0.10000% | 1.00000% |
| Water | 25.00000% | 40.00000% |
| zinc compound | 0.00100% | 0.10000% |

The physical solid-state characteristics of QuietGlue™ adhesive include:

1) a broad glass transition temperature starting below room temperature;
2) mechanical response typical of a rubber (i.e., high elongation at break, low elastic modulus);
3) strong peel strength at room temperature;
4) weak shear strength at room temperature;
5) swell in organic solvents (e.g., Tetrahydrofuran, Methanol);
6) does not dissolve in water (swells poorly); and
7) peels off the substrate easily at temperature of dry ice.

Following glue layer 12 is a metal layer 13. Metal layer 13 is, in one embodiment, 30 gauge galvanized steel of 0.013 inch thickness. Of course, other gauge galvanized steel and even other metals can be used if desired. For example, aluminum can also be used if desired, as can specialty metals such as sheets of ultra-light weight titanium and laminated layers of metal including laminates of aluminum and titanium. Of importance is that galvanized steel, if used, be non-oiled and of regular spackle. Non-oil is required to insure that the QuietGlue™ adhesive layer 12 will adhere to the top surface of metal layer 13 and the adjacent QuietGlue™ adhesive layer 14 on the bottom of metal layer 13 will also adhere to the surface of metal layer 13. Regular spackle insures that the metal has uniform properties over its whole area.

Next, glue layer 14 is placed in a carefully controlled manner with respect to coverage and thickness on the bottom of metal layer 13. Glue layer 14 is again a viscoelastic material which absorbs sound and is typically the same material as glue layer 12. Finally, gypsum board layer 15 is placed on the bottom of the structure and carefully pressed in a controlled manner with respect to uniform pressure (pounds per square inch), temperature and time Finally, the assembly is subjected to dehumidification and drying to allow the panels to dry, typically for twelve to forty-eight (48) hours.

Typically, but not always, gypsum board layers 11 and 15 will contain fiber to reduce shrinkage so that the resulting laminar structure will meet fire codes. Typical fire codes require a wall structure capable of withstanding flames for up to one hour. The metal core, together with the external gypsum board layers are intended to give to the resulting laminar structure a minimum of one hour resistance to fire, and possibly as high as four (4) hours in certain configurations, and thereby allows the resulting structure to meet typical fire codes.

Metal layer 13, typically 30-gauge steel (but may be other metals, ranging from 10 gauge to 40 gauge, depending on weight, thickness, and STC desired), is about the thickness of a business card. Of importance, before assembling, this metal should not be creased because creasing will ruin the ability of this metal to assist in reducing the transmission of sound. Only completely flat, undamaged pieces of metal can be used in the laminar structure.

In an alternative embodiment, steel 13 is replaced by massloaded vinyl or similar product. However, the steel has much less forgiveness than vinyl and thus can outperform vinyl as a constraining layer. However, for other ease-of-cutting reasons, vinyl can be used in the laminar structure in place of steel, if desired. Cellulose, wood, gypsum, plastic, ceramic, composite or other constraining materials may also be used in place of vinyl or metal. The alternative material can be any type and any appropriate thickness.

The resulting structure is capable of being cut using standard wood saws with wood blades.

FIG. 2 shows laminar panel 61. Two external layers 21 and 29 of gypsum board have coated on each of their interior faces a layer of QuietGlue™ adhesive 22 and 28, respectively, preferably made of a viscoelastic polymer, such as glue 12 in FIG. 1. Such a viscoelastic polymer has the ability to absorb sound energy through deformation of the viscoelastic material in response to the acoustic energy of the sound. On the interior faces of the QuietGlue™ adhesive are two sheet metal layers 23 and 27. Typically, these sheet metal layers 23 and 27 are each galvanized steel. In one embodiment, the galvanized steel is 30 gauge, 0.013 inches thick, but other thicknesses of steel, as well as other metals, can also be used as desired. The interior faces of the steel layers 23 and 27 are coated with additional layers 24 and 26, respectively, of quiet glue, again a viscoelastic material of the same type as glue layers 22 and 28. Then the core of the structure is made up of a pine laminar sheet 25 which is of a type commonly used in plywood. In one embodiment, the pine laminar sheet is 1/10$^{th}$ of an inch thick, but may also be MDF or other wood types.

Again, the galvanized steel is non-oiled and regular spackle for the reasons discussed above in conjunction with the embodiment of FIG. 1. The layers of glue are all viscoelastic material capable of absorbing sound. The resulting product has a thickness of approximately 7/8$^{th}$ of an inch and weighs approximately 148 pounds per 4×8 section. The stand-alone STC for the resulting material is 42 which yields a double-sided standard construction STC of 62. The steel layers should not be creased before assembly. Creasing of the steel may ruin the steel for its intended purpose. Using completely flat pieces undamaged is required to achieve optimal results. The resulting structure again is cutable with a standard power saw using wood blades. The interior layer 25 of wood is in one embodiment Sierra pine 1/10$^{th}$ inch thick MDF acquired in Rocklin, Calif. (http://www.sierrapine.com).

In fabricating the structures of FIGS. 1 and 2, the glue is first rolled in a prescribed manner, typically to 1/16 inch thickness, although other thicknesses can be used if desired, onto the gypsum and then steel is laid on the glue. Depending on the drying and dehumidification techniques deployed, anywhere from 6 to 48 hours are required to dry totally the glue in the case that the glue is water-based. A solvent-based viscoelastic glue can be substituted. The resulting structure is dried in a prescribed manner under a pressure of approximately 1 to 5 pounds per square inch, depending on the exact requirements of each assembly, although other pressures can be used as desired. To make laminar panel 61 of FIG. 2, each of the gypsum board-glue-metal layer structures has an additional layer of glue rolled onto the exposed surface of the metal to approximately 1/16$^{th}$ inch thickness and then the thin pine wood layer is placed between the two layers of glue on the already fabricated gypsum-glue-metal sheets. The resulting structure is placed in a press and 1 to 5 pounds per square inch of pressure is applied to the structure and up to 48 hours is allowed for drying.

FIG. 3 shows another embodiment of the acoustical soundproofing material useful for practicing the invention. In FIG. 3, laminar panel 62 is constructed of two external layers of gypsum board 30 and 34 that have on their interior faces glue layers 31 and 33, respectively. Between the two glue layers 31 and 33 is a constraining material 32 made up of vinyl. This vinyl is mass loaded and, in one embodiment, is 1 pound per square foot or greater, and is available from a number of manufacturers, including Technifoam, Minneapolis, Minn. The total weight of this structure when the external layers 30 and 34 of gypsum board are each 5/8 inch thick, the layers of viscoelastic QuietGlue™ adhesive 31 and 33 are each approximately 1/16 of an inch thick and the mass loaded vinyl is approximately 1/8 of an inch thick, is about 190 pounds per 4×8 foot section. The total finished thickness of the material is 1.3 to 1.5 inches depending on the thickness of the vinyl and the actual thicknesses of the viscoelastic QuietGlue™ adhesive layers 31 and 33.

The embodiment of FIG. 3 cannot be scored like regular drywall, but rather must be cut using a wood saw. A typical wood saw blade is adequate to actually cut the soundproofing material of FIG. 3.

FIG. 4 shows an additional embodiment of a soundproofing panel 63 which can be used to implement the invention. In this embodiment, two external layers 35 and 39 are 5/8 inch plywood and have on their interior faces layers 36 and 38 of QuietGlue™ adhesive, respectively. Between the QuietGlue™ adhesive is a layer of mass loaded vinyl 37. The structure shown in FIG. 4 is meant to be used on floors or in other construction areas where wood would normally be used. The plywood sheets 35 and 39 are each typically 5/8 inch thick in one embodiment. In this embodiment, the layers of QuietGlue™ adhesive 36 and 38 are each approximately 1/16 inch thick (although other thicknesses can be used if desired) and the mass loaded vinyl 37 is typically 1/16 to 1/4 inch thick. When the mass loaded vinyl is 1/8 inch thick, then the total thickness of the structure of FIG. 4 is approximately 1.5 inches thick. If the vinyl is 1/16 inch thick, then the total thickness is approximately 1.4 inches.

The structure of FIG. 3 standing alone has an STC of 38, while the structure of FIG. 4 has an STC of 36. The structures of FIGS. 1 and 2 have STCs of 37 and 38, respectively.

It is noted that uneven application of QuietGlue™ adhesive or leaving an air gap at the ends of the sheets of soundproofing material described above may hurt the STC ratings by several db. Moreover, to improve the soundproofing qualities of walls, floors, ceilings or doors made with these materials, glue must be evenly applied all the way to the ends and corners of the sheets. None of the panels described above can be scored like regular drywall. Rather, these panels must be cut using a saw blade, typically a wood saw blade.

The sound transmission class (STC) ratings given above and the impact insulation class (IIC) ratings discussed below basically are numbers which are used in the architectural field to rate partitions, doors and windows for their effectiveness in blocking sound or impact respectively. The number assigned to a particular partition design as a result of STC or IIC testing represents a best fit type of approach to a set of curves that define the sound transmission class or impact insulation class. The test is conducted in such a way to make it independent of the test environment and gives a number for the partition only. The STC measurement method is defined by ASTM E90 laboratory test for sound measurements obtained in 1/3 octave bands, and ASTM E413 for calculating "STC" (Sound Transmission Class) numbers from the sound transmission loss in each partition, and these standards are available on the internet at http://www.astm.org. The IIC measurement method is defined by ASTM E492 laboratory test for impact sound pressure level measurements obtained in 1/3 octave bands, and ASTM E989 for calculating "IIC" (Impact Insulation Class) numbers from the impact sound pressure level obtained for each partition, and these standards are also available on the Internet at http://www.astm.org.

Data showing the transmission loss in decibels as a function of frequency for the soundproofing panels of FIGS. 3 and 4 is set forth in FIGS. 5, 6, 7, 8, 9 and 10. FIG. 5 shows a standard 2×4 construction with QuietRock™ multi-layer engineered drywall panel 540 Solitude, as shown in FIG. 3, on both sides of studs with no insulation. The transmission loss in decibels varies from 25 db at 63 Hz to approximately 58 db at 4,000 Hz.

The center frequency of 1/3 octave bands is set forth in the two rows of the table. The top line of each row represents the 1/3 octave band center frequency. The second row of numbers in each horizontal category represents the total in db, and the third set of numbers represents a 95% confidence level in db deficiencies. The EWR and OITC stand for External Wall Rating and Outdoor-Indoor Transmission Class, respectively, and represent other methods of measuring transmission loss. The final sound transmission class number is set forth under the notation STC in the lower right corner. For the use of two panels of the type shown in FIG. 3, on both sides of standard 2"×4" wood stud construction, the STC is 54.

It is known to those practicing in this field that a similar configuration with standard 5/8 inch drywall on both sides of standard 2×4 construction yields an STC of 34. Accordingly, this invention yields a 20 STC point improvement over standard drywall in this particular construction.

The National Research Council of Canada (NRC) has documented the STC rating of many other configurations (e.g., using wood and steel studs in standard, staggered beam or double beam construction with various isolators such as resilient channels and with various acoustic insulation fillers such as sound board, cellulose and fiberglass batt). Panels 60-63 have been subjected to the same types of tests.

Figure 6:
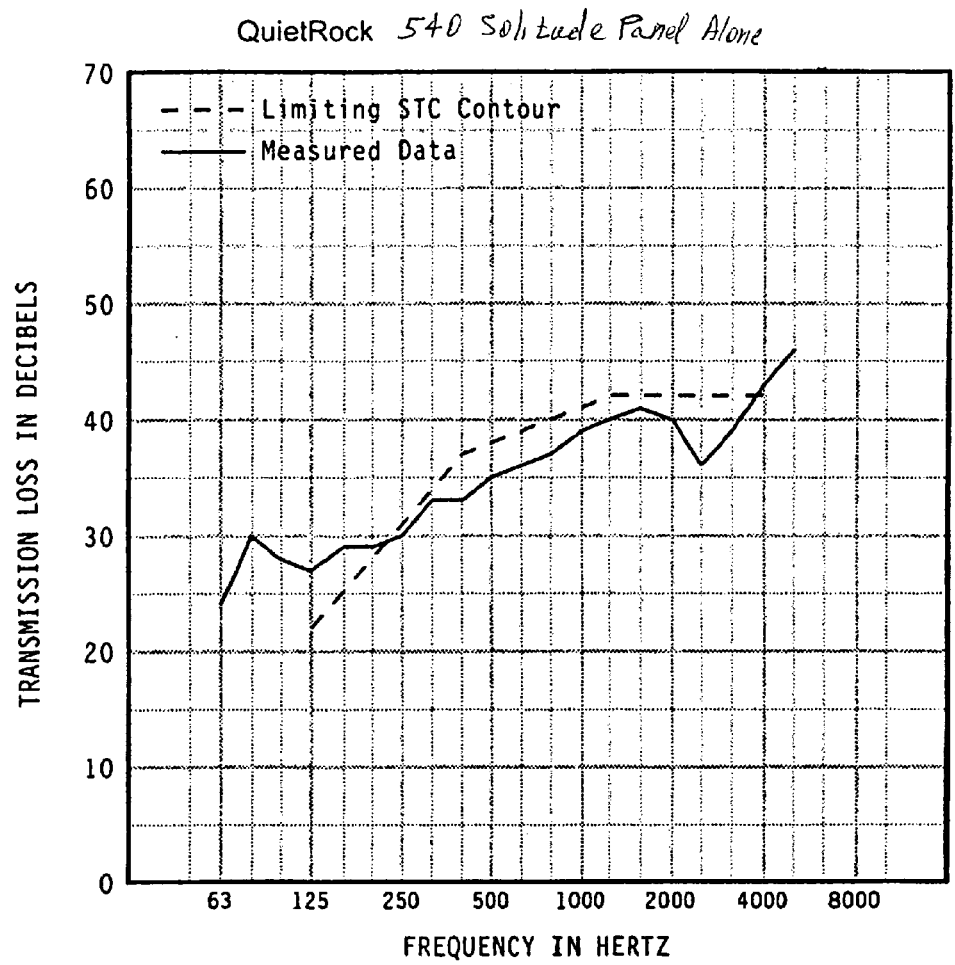

The use of a single panel, alone, of the type shown in FIG. 3 yields an STC of 38, as shown in the bottom right corner of FIG. 6. Thus, the use of the single panel of the type shown in FIG. 3 to reduce sound transmission is less effective than the use of two panels of the type shown in FIG. 3 on both sides of 2×4 studs as shown in FIG. 5.

Figure 7:
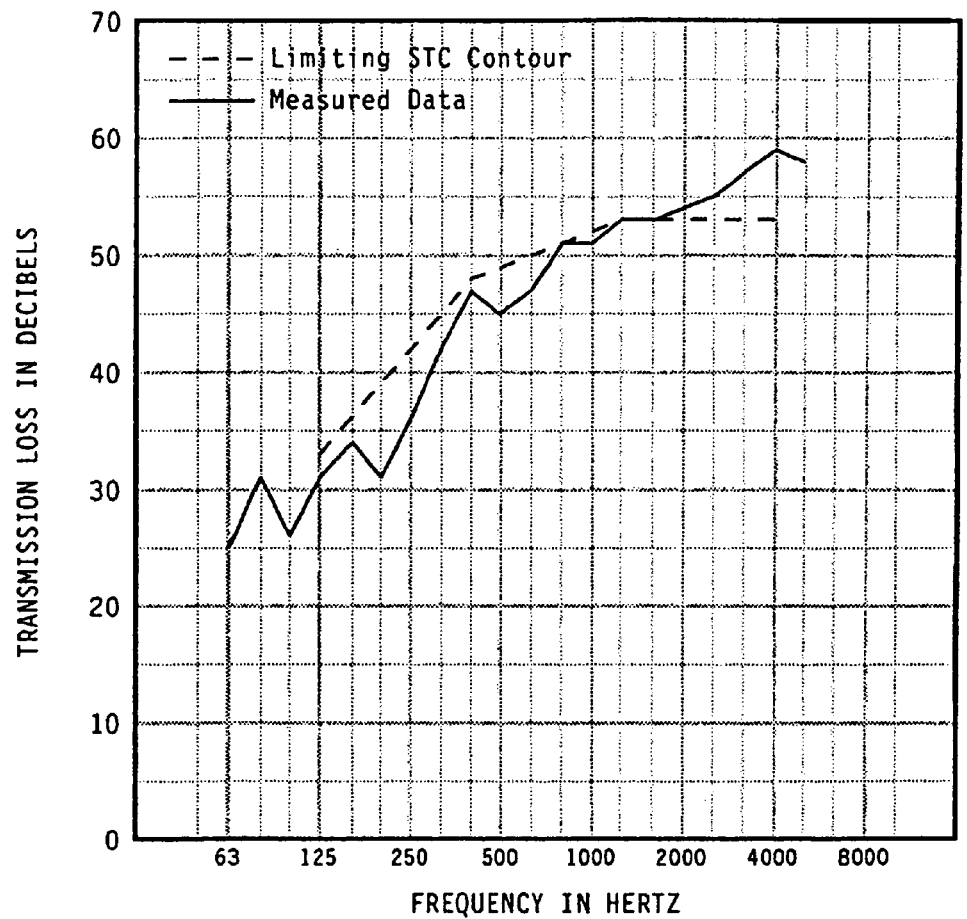

The use of the structure shown in FIG. 4 on both sides of standard 2×4 construction results in an STC of 49, as shown in FIG. 7. This indicates that the wood structure shown in FIG. 4 is less effective in reducing sound transmission than the structure shown in FIG. 3, which contains gypsum board on the external surfaces together with an internal layer of vinyl, though both are significant improvements over standard materials.

FIG. 7 shows that the use of the wood structure in FIG. 4 on both sides of 2×4 studs alone, with no insulation, has an STC of 49, which is lower than the STC rating of 54 given to the structure of FIG. 3 in a similar configuration (see FIG. 5). It is known to those practicing in this field that a similar wall with standard plywood on both sides yields an STC rating of 29. Thus, this represents a significant improvement over standard wood.

Figure 8:
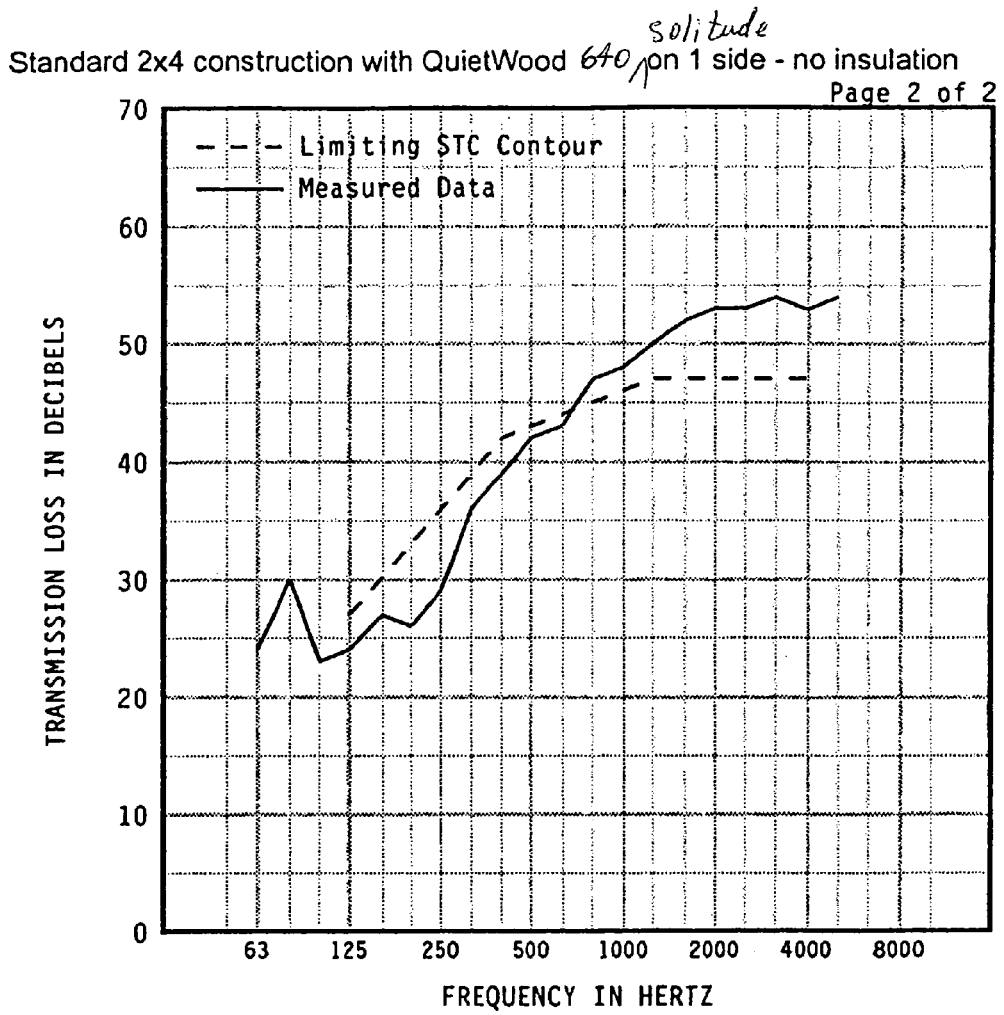

The use of the structure of FIG. 4 on one side with no insulation with standard 2×4 construction results in an STC of 43, as shown in the graph of FIG. 8. This is a substantial improvement in sound attenuation over standard plywood, but not as good as use of standard 2×4 construction with the structure of FIG. 4 on both sides of the studs which yields an STC of 49, as shown in FIG. 7.

Figure 9:
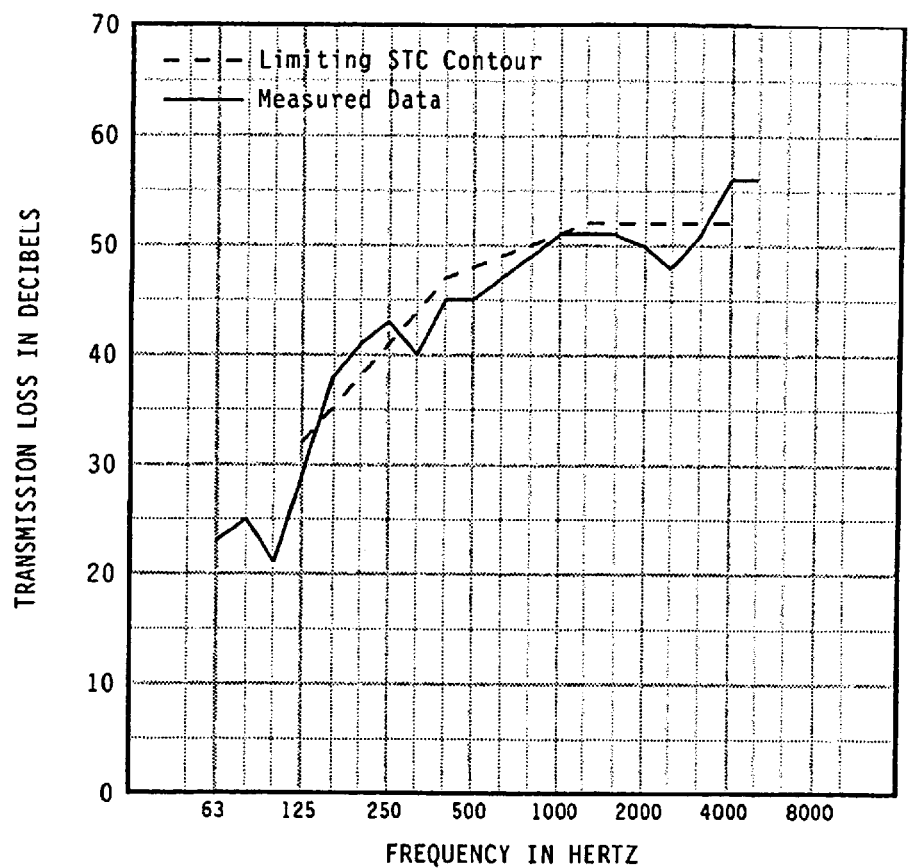
Figure 10:
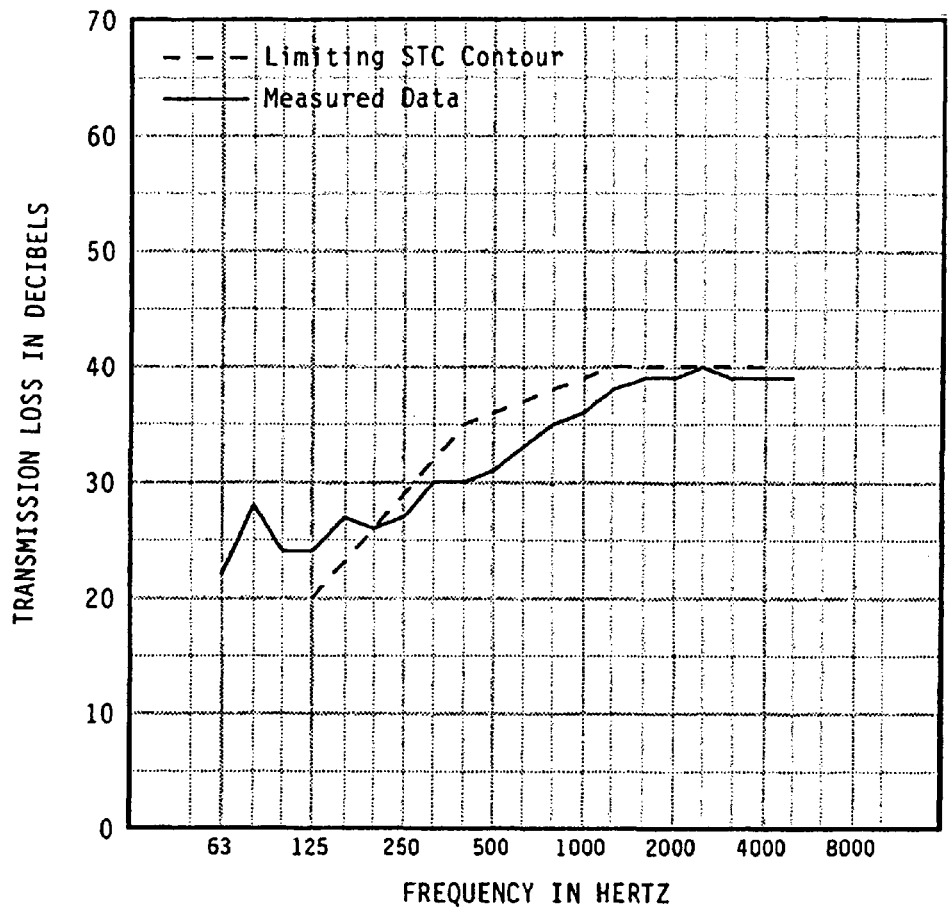

FIG. 9 shows that use of the panel of FIG. 3 on one side of standard 2×4 construction with no insulation yields an STC of 48 which is better than the STC of 43 shown in FIG. 8 obtained using the structure of FIG. 4 in the same configuration. Finally, the use of the structure of FIG. 4 alone results in an STC of 36 as shown in FIG. 10, which is below the STC of 38 (FIG. 6) for the structure of FIG. 3 in a similar configuration.

Accordingly, laminar structures as described herein provide a significant improvement in the sound transmission class number associated with the structures compared to prior art structures and thus reduces significantly the sound transmitted from one room to adjacent rooms.

An alternative embodiment of this invention is asymmetric, being made up of a relatively thick layer of material on one surface of which is placed viscoelastic glue. Over the viscoelastic glue is placed a thin layer of material relative to the first layer of material. This thin layer of material can be a constraining layer, such as metal or vinyl or rubber or ceramic or composite or any other appropriate thin material. This structure has sound reducing qualities, but is lighter and easier to handle than the structures described in FIGS. 1 through 4. Such a structure, for example, could be made up of layers 11, 12 and 13 of the structure shown in FIG. 1.

Figure 11:
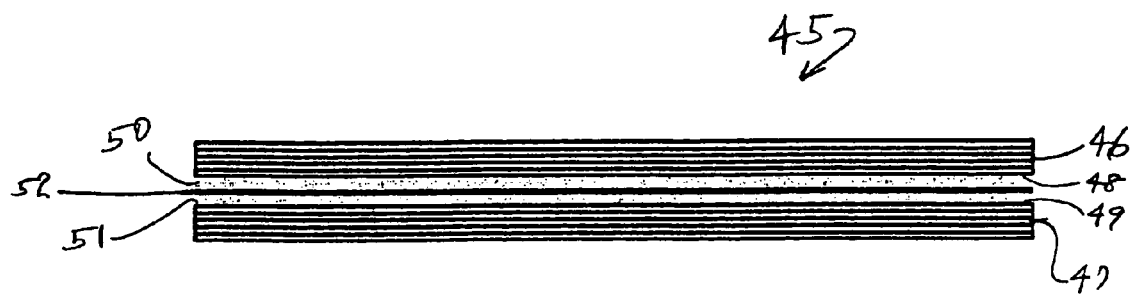
FIGS. 11 and 12 show other embodiments of laminar panels which can be utilized in constructing a soundproof assembly in accordance with the invention.

One version of a laminar panel suitable for use in connection with the present invention is illustrated in FIG. 11. In this version, laminar panel 45 includes a layer 46, which may be for example ⅝" inch thick plywood, and layer 47, which also may be ⅝" inch thick plywood. Other thicknesses of plywood may also be utilized, and it is not necessary that both layers have the same thickness. The inner surfaces 48 and 49 of layers 46 and 47 respectively are coated with a viscoelastic polymer, such as the glue 12 utilized in the structure of FIG. 1. The characteristics of the viscoelastic polymer are described previously herein in connection with the prior figures. Viscoelastic glue layers 50 and 51 may be, for example, 1/16" of an inch thick, however of course other thicknesses may be utilized. In the laminar panel of FIG. 11, a constraining layer 52 of metal, which typically may be 30-gauge steel, however other thicknesses may be used ranging from 10 gauge to 40 gauge depending on weight, thickness, and STC desired for panel 45. Constraining layer 52 should not be creased since doing so will reduce the ability of the structure to reduce the transmission of sound. Only completely flat, undamaged pieces of metal should be utilized in this laminar structure. Suitable metals for constraining layer 52 include galvanized steel, stainless steel, aluminum, ultra-light weight titanium and laminated layers of metal including laminates of aluminum and titanium. A composite of two or more metals may also be used.

If galvanized steel is utilized for constraining layer 52, it should be non-oiled and of regular spackle, and as noted above it should not be creased and should be perfectly flat. In constructing laminar panel 45, viscoelastic glue layers 50 and 51 are rolled onto surfaces 48 and 49, respectively, of layers 46 and 47. Next, constraining layer 52 is placed on the exposed surface of viscoelastic glue layer 51, and layer 46 with its associated layer 50 of viscoelastic glue are then placed on top of the constraining layer 52. The structure is then compressed using a pressure of approximately 1 to 5 lbs. per square inch. Application of heat may also be used and if so the temperature range would be about 90 degrees to 130 degrees fahrenheit.

Laminar panel 45 is particularly advantageous when used as a material for floors or in other applications where wood alone would normally be utilized.

Figure 12:
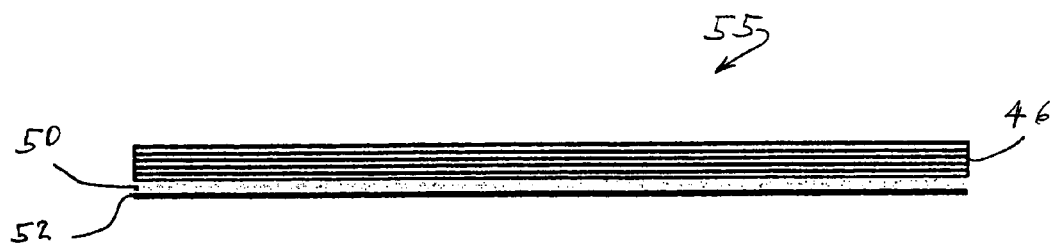

FIG. 12 illustrates a further version of a laminar panel which may be used in practicing the present invention. Laminar panel 55 includes layer 46, viscoelastic glue layer 50 and constraining layer 52, all as described above in connection with laminar panel 45. However, in the version of FIG. 12 neither a second layer of viscoelastic glue nor a second layer of another material is required. Laminar panel 55 also produces sound reducing characteristics and depending on the requirements, may be sufficient as a replacement for a wood layer alone.

The dimensions given for each material in the laminar structures of this invention can be varied as desired to control cost, overall thickness, weight and STC results. The described embodiments and their dimensions are illustrative only and not limiting.

Figure 13:
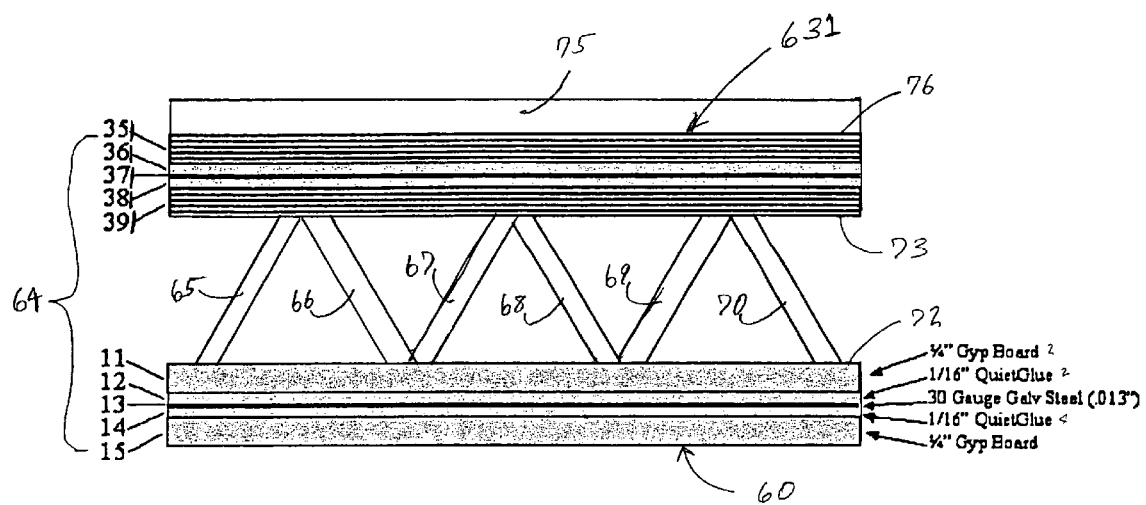
FIG. 13 shows a soundproof assembly according to one embodiment of the invention.

One embodiment of the present invention is illustrated in FIG. 13. In this embodiment, soundproof assembly 64 is utilized to provide an airborne and impact noise reduction in a floor to ceiling construction. In the orientation illustrated in FIG. 13, laminar panel 60 is the ceiling of a room beneath panel 60 and laminar panel 631 provides the floor support for a room above it. Utilization of laminar panel 631 avoids the use of the difficult prior art construction, which as described above utilizes among other things light-weight concrete and acoustical resilient floor underlayment. Thus the present invention overcomes problems of the prior art and simplifies the construction of panel which may be utilized to support a floor.

In the soundproof assembly 64, the laminar panel 60 is attached to a truss joist system, which in FIG. 13 is constructed utilizing truss members indicated by reference characters 65, 66, 67, 68, 69, and 70. These truss members may be wood, aluminum or any suitable construction material. If they are wood or aluminum, laminar panel 60 would be nailed to these truss members. As will be appreciated from reference to FIG. 13, the drawing is not to scale. A typical distance between surfaces 72 of laminar panel 60 and surface 73 of laminar panel 631 would be about 8 to 24 inches. Although in the soundproof assembly 64 of FIG. 13 a truss arrangement is illustrated, it of course will be appreciated that other support structures may be utilized such as, for example, standard wood joists, and vertical I-beams.

Although in the structure of FIG. 13 the soundproof assembly 64 is utilized between a living space beneath laminar panel 60 and above laminar panel 631 in a floor/ceiling arrangement, it will also be appreciated that a structure such as that illustrated in FIG. 13 may be utilized where the panels are vertically oriented to provide a soundproof assembly to reduce the sound transmitted from room to room on the same floor level.

In this structure of FIG. 13, laminar panel 631 may be attached to the upper ends of truss members 65-70 by usual construction means such as nails or screws. Following the attachment of laminar panel 631 to truss members 65-70, a layer of floor material 75 may be applied to surface 76 of laminar panel of 631. The present invention does not require the application of floor material 75. Reduced sound transmission and increased impact insulation is achieved by the use of soundproof assembly 64 without more. Floor material 75 may take one of many forms, for example a wood floor, ceramic tile, or vinyl tile. If floor layer 75 is wood, it may be attached directly to surface 76 of panel 631, however if floor layer 75 is constructed of other materials, it may be necessary to provide a preparatory layer on surface 76 before floor layer 75 is applied. The techniques for such preparation are well known to those skilled in the art and a description of them is not necessary.

In practicing the present invention, although soundproof assembly 64 illustrated in FIG. 13 utilizes previously described panel 60, it will of course be appreciated that other panels such as those described herein may be utilized. In the embodiment of FIG. 13, laminar panel 631 includes layer 351 of 7/16" thick plywood or alternatively 7/16" thick oriented strand board (OSB). Next, layer 361 of QuietGlue™ adhesive is interposed between the inner surface of layer 351 and constraining layer 371 which is 18 mil galvanized steel. The thickness of glue layer 361 and its manner of application was the same as that described above for glue layer 36 in laminar panel 63 disclosed in FIG. 4. Similarly, layer 381 of Quiet-Glue™ adhesive is interposed between the lower surface of constraining layer 371 and the upper surface of layer 391 which was 9/32" thick tongue and groove plywood. Alternatively layer 391 could be 9/32" thick OSB. Glue layer 381 was of the same thickness as glue layer 38 in FIG. 4. Laminar panel 631 is commercially available from Quiet Solution, Inc. under the product name QuietWood™ panel 631. As an alternative to laminar panel 631 in soundproof assembly 64, laminar panels such as 45, 55 and 63 illustrated in FIGS. 11, 12 and 4 respectively could be substituted. Similarly, as an alternative to laminar panel 60, laminar panels such as 61 or 62 shown in FIGS. 2 and 3 respectively could be utilized.

FIGS. 14, 16, 18, 20 and 22 are plots of the Normalized Impact Sound Pressure Level (NISPL) for several different floor/ceiling assemblies. The NISPL data is used to determine the IIC rating of an assembly. The top four lines on the figures identify the sample under test. Below these four lines data is provided describing the environmental conditions during the test. Beneath the environmental data, details of the assembly under test. The plot on the lower left section of the figure shows the data collected, which is indicated by the curve with the dots, along with the corresponding best fit IIC curve. As will be noted, the curves plot Impact Sound Pressure Level in decibels as a function of frequency. The vertical bars along the bottom of the plot with associated numbers indicate the number of deficiencies for each ⅓ octave band as defined in ASTM E 989. The table on the lower right portion of the figure lists on the left the center frequency of each ⅓ octave band (excluding the data representing the frequencies 25, 32 and 40 hertz) and on the right the NISPL for each corresponding ⅓ octave band. The IIC rating is listed in the title of each plot. The term $L_{n,w}$ denotes Weighted Normalized Sound Pressure Level.

FIGS. 15, 17, 19, 21 and 23 are plots of the Transmission Loss (TL) for several different floor/ceiling assemblies. As noted in the figures, transmission loss in decibels is plotted as a function of frequency. The TL data is used to determine the STC rating of an assembly. The top four lines on the figures are used to identify the sample under test. Below those four lines is a line showing the area under test, followed by several lines describing the details of the assembly under test. The plot on the lower left section of the figure shows by the curve indicated by reference character A the data collected along with the corresponding best-fit STC curve indicated by reference character B. The table on the lower right lists on the left the center frequency of each ⅓ octave band and on the right the TL for each corresponding ⅓ octave band. The STC rating is provided above the curves in the plot. The bars along the bottom of the plot with associated numbers indicate the number of deficiencies for each ⅓ octave band as described in ASTM E 989. The term $R_w$ indicates Weighted Sound Reduction as defined by ISO 717 and the term OITC indicates Outdoor-Indoor Transmission Class and is defined by ASTM E 1332.

FIGS. 14 and 15 are the IIC and STC plots respectively for a floor/ceiling assembly with 18" deep trusses and with QuietWood™ panel 631 Serenity illustrated in FIG. 13 attached to the top of the trusses with QuietRock™ multi-layer engineered drywall panel 530 Serenity (FIG. 1) attached to the bottom of the truss. This assembly is hereinafter referred to as the base assembly, and is shown in FIG. 13 where it is indicated by reference character 64. As indicated in FIGS. 14 and 15, the assembly provided an IIC rating of 42 and a STC rating of 53.

Figure 24:
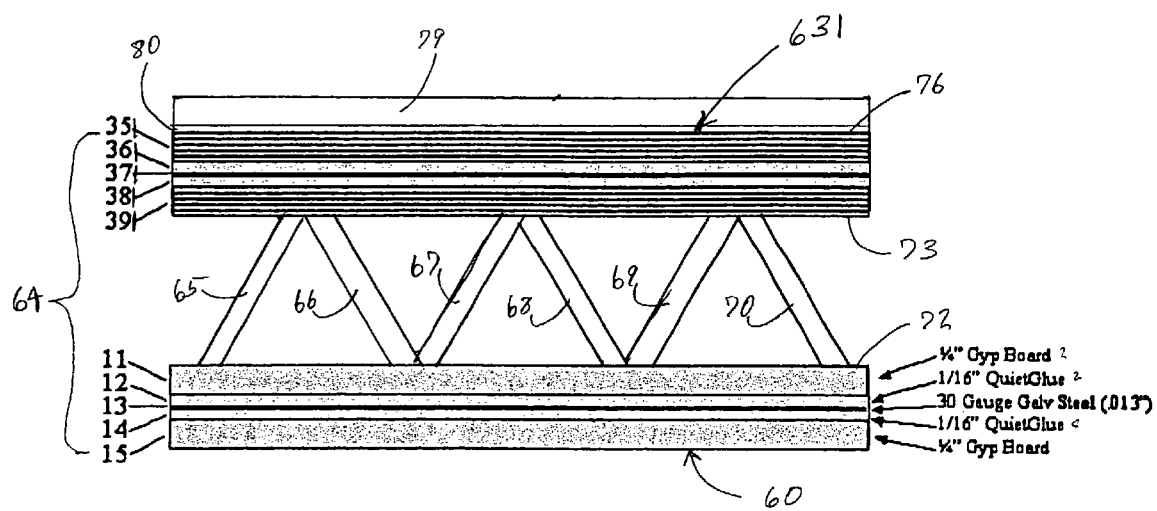
FIGS. 24-27 show soundproof assemblies according to other embodiments of the invention.

FIGS. 16 and 17 are the IIC and STC plots respectively for the base assembly 64 with carpet 79 and a carpet pad 80 placed on top of surface 76 of QuietWood™ panel 631 Serenity. This assembly is illustrated in FIG. 24. Carpet pad 80 consisted of foam which was 9.5 mm thick 2.2 density underpad. Carpet 79 was a 25.5 oz carpet. This assembly provided an IIC rating of 74 and a STC rating of 53.

Figure 25:
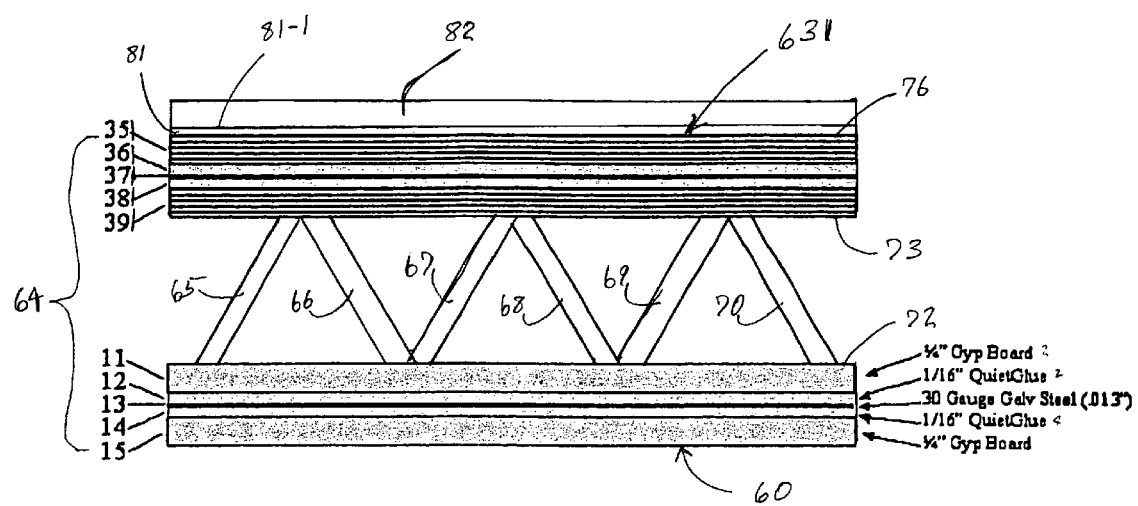

FIGS. 18 and 19 are the IIC and STC plots respectively for the base assembly 64 (FIG. 13) with a 9 mm thick layer of QuietFoam™ underlayment 81 on the top of surface 76 of QuietWood™ panel 631 which is indicated by reference character 631, and a 27 mm thick parquet wood floor 82 position on the surface 81-1 of QuietFoam™ underlayment 81. This assembly, which is illustrated in FIG. 25, provided an IIC rating of 45 and a STC rating of 54. QuietFoam™ underlayment 81 has a composition of ⅜" polyethelene closed cell foam. However many other thickness of foam can be used. Alternative foam underlayment materials may be obtained from sources such as QuietZone® Acoustic floor Mat which may be found on the Internet at www.owenscorning.com.

Figure 26:
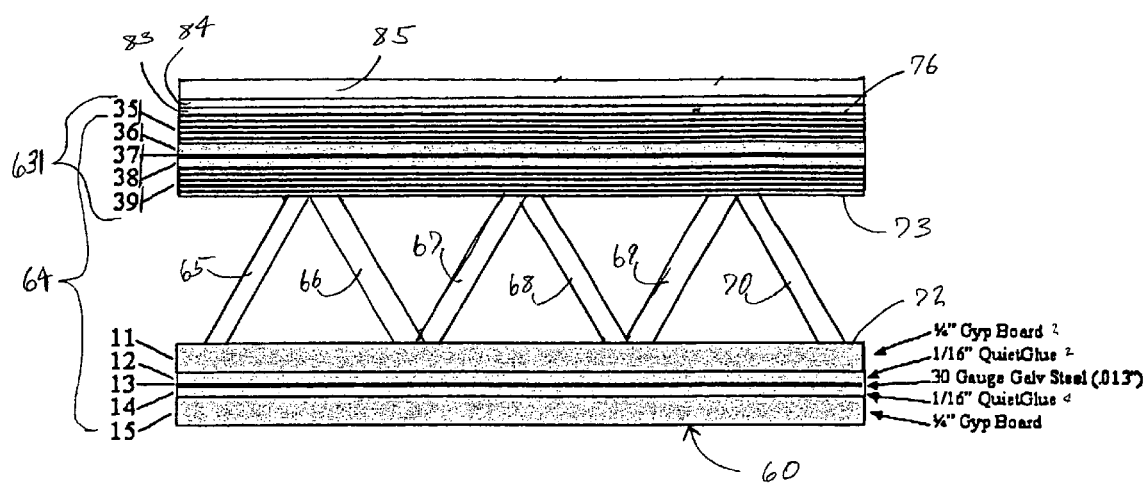

FIG. 26 illustrates another sound proof assembly in accordance with the invention. FIGS. 20 and 21 are the IIC and STC plots respectively for this embodiment which includes base assembly 64 with a layer of QuietFoam™ underlayment 83 approximately 9 mm thick, a layer of oriented strain board (OSB) 84 approximately 11 mm thick, with a hardwood floor 85 approximately 9 mm thick on top of OSB 84. This assembly provided an IIC rating of 48 and a STC rating of 54.

Figure 27:
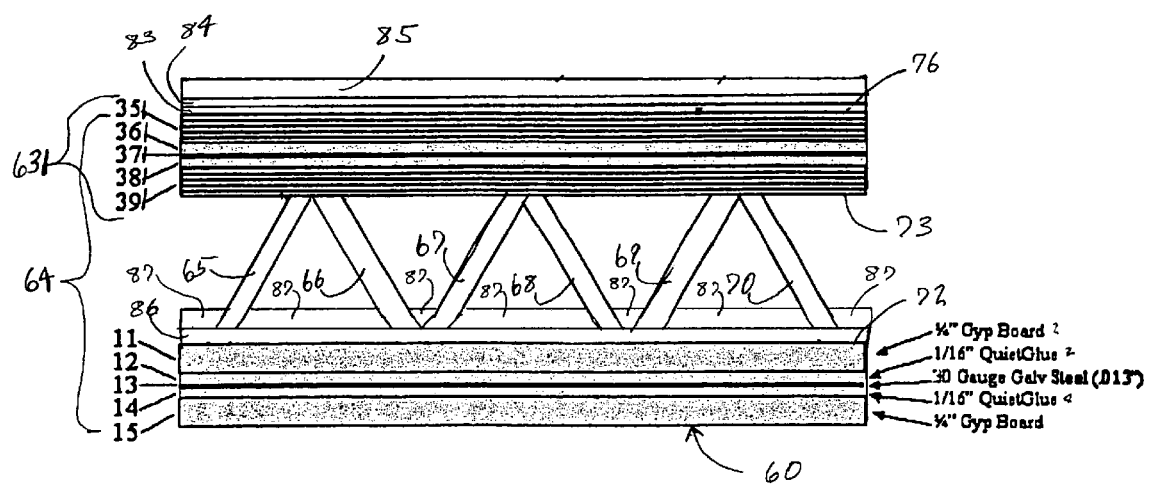

FIGS. 22 and 23 are the IIC and STC plots respectively for the assembly shown in FIG. 27 which includes the base assembly 64 with a layer of QuietFoam™ underlayment 83 approximately 9 mm thick, a layer of oriented strain board (OSB) 84 approximately 11 mm thick, with a hardwood floor 85 on top of OSB 84. Further, wood furring strips 86 are attached to the bottom of the joists 65-70 and the QuietRock™ multi-layer engineered drywall panel 530 Serenity™ laminar panel 60 is attached to the furring strips 86. Fiberglass insulation in the form of batts 87, which are 241 mm thick, are supported on furring strips 86. Other types of insulating materials such as mineral fiber may of course be used. This assembly provided an IIC rating of 51 and a STC rating of 58. As indicated in FIGS. 14-23, the joints between panels were sealed with a QuietSeal™ sealer product which is available from Quiet Solution, Inc., 522 Almanor Ave., Sunnyvale, Calif. 94085. The product is composed of Butyl-based electrometric sealant. Alternative products include SheetRock™ Brand Acoustical Sealant by USC or SC-174 Draft & Sound Stop Sealant by OSI.

Other embodiments of this invention will be obvious in view of the above description.

What is claimed is:

1. A soundproof assembly for use in building construction, employing a support structure having a top and a bottom, comprising:
    a first laminar panel having a first layer of material having a first composition;
    a second laminar panel having a second layer of material having a second composition, which is different than the first composition;
    wherein at least one of the laminar panels includes at least two layers of material separated by viscoelastic glue; and further wherein
    said first laminar panel is secured to the top of the support structure; and
    said second laminar panel is secured to the bottom of the support structure; and
    said viscoelastic glue comprises a minimum of 33% up to a maximum of 65% acrylate polymer, by weight.

2. The soundproof assembly of claim 1, wherein the first laminar panel and the second laminar panel are positioned on the support structure such that a plane of the first laminar panel is parallel to a plane of the second laminar panel.

3. The soundproof assembly of claim 1, wherein one of the first and second laminar panels includes at least one layer of a selected thickness gypsum board.

4. The soundproof assembly of claim 3, wherein the other of the first and second laminar panels includes a layer of material selected from the group consisting of a cellulose-based material and wood.

5. The soundproof assembly of claim 1, wherein one of the first and second laminar panels includes a layer of material selected from the group consisting of a cellulose-based material and wood.

6. The soundproof assembly according to claim 1, wherein the first layer of material comprises a layer of material selected from the group consisting of a cellulose-based material and wood; and further wherein the first laminar panel comprises a first layer of viscoelastic glue on one surface of the first layer of material and at least a first constraining layer of material positioned on an exposed surface of the first layer of viscoelastic glue.

7. The soundproof assembly according to claim 6, further comprising a second layer of viscoelastic glue positioned on an exposed surface of the first constraining layer of material and a third layer of material selected from the group consisting of a cellulose-based material and wood positioned on an exposed surface at the second layer of viscoelastic glue.

8. The soundproof assembly according to claim 6, wherein the first constraining layer of material comprises a layer of metal.

9. The soundproof assembly according to claim 8, wherein the layer of metal comprises a sheet metal layer.

10. The soundproof assembly according to claim 9, wherein the sheet metal layer comprises a layer of galvanized steel.

11. The soundproof assembly according to claim 6, wherein the first constraining layer of material comprises a layer selected from the group consisting of vinyl, plastic composite, rubber, ceramic and composite.

12. The soundproof assembly according to claim 1, wherein the second layer of material comprises a layer of gypsum board; and further wherein the second laminar panel comprises a first layer of a viscoelastic glue on one surface of the layer of gypsum board and at least a first constraining layer of material positioned on an exposed surface of the first layer of viscoelastic glue.

13. The soundproof assembly according to claim 12, further comprising a second layer of viscoelastic glue positioned on an exposed surface of the first constraining layer of material and a third layer of a selected thickness gypsum board positioned on an exposed surface at the second layer of viscoelastic glue.

14. The soundproof assembly according to claim 12, wherein the first constraining layer of material comprises a layer of metal.

15. The soundproof assembly according to claim 14, wherein the layer of metal comprises a sheet metal layer.

16. The soundproof assembly according to claim 15, wherein the sheet metal layer comprises a layer of galvanized steel.

17. The soundproof assembly according to claim 12, wherein the first constraining layer of material comprises a layer selected from the group consisting of vinyl, plastic composite, rubber, ceramic and composite.

18. The soundproof assembly according to claim 1, wherein the second layer of material comprises an external layer of the second laminar panel, and wherein the second laminar panel further comprises:
    a third external layer of material; and
    one or more interior constraining layers of material intermediate the second and third external layers, the one or more interior constraining layers of material having viscoelastic glue layers positioned on surfaces thereof.

19. The soundproof assembly according to claim 18, wherein the one or more interior constraining layers of material comprise: a first constraining layer of metal and a second constraining layer of another material.

20. The soundproof assembly according to claim 19, wherein the second constraining layer comprises a layer of material selected from the group consisting of a cellulose-based material and wood.

21. The soundproof assembly according to claim 18, wherein the second layer of material and the third external layer of material both comprise gypsum board.

22. The soundproof assembly according to claim 19, wherein the second layer of material and the third external layer of material both comprise gypsum board.

23. The soundproof assembly according to claim 18, wherein the one or more interior constraining layers of material comprise:
 a first constraining layer of metal; and
 a second constraining layer of metal.

24. The soundproof assembly according to claim 23, wherein the second layer of material and the third external layer of material both comprise gypsum board.

25. The soundproof assembly according to claim 19, wherein the layer of metal comprises a sheet metal layer.

26. The soundproof assembly according to claim 25, wherein the sheet metal layer comprises a layer of galvanized steel.

27. The soundproof assembly according to claim 23, wherein the first constraining layer of metal comprises a sheet metal layer and the second constraining layer of metal comprises a sheet metal layer.

28. The soundproof assembly according to claim 27, wherein the sheet metal layer of the first constraining layer and the second constraining layer each comprise a layer of galvanized steel.

29. The soundproof assembly of claim 1 further comprising insulating material positioned intermediate the first laminar panel and the second laminar panel.

30. The soundproof assembly of claim 29, wherein the insulating material is supported by a surface of one of the first and second laminar panels.

31. The soundproof assembly of claim 29, wherein the insulating material comprises one or more layers of fiberglass material, or one or more layers of mineral fiber.

32. The soundproof assembly at claim 30 wherein the insulating material comprises one or more layers of fiberglass material, or one or more layers of mineral fiber.

33. A method of manufacturing a soundproof assembly, for use in building construction, employing a support structure, the method comprising:
 providing a first laminar panel which comprises a first constraining layer of material, a first layer of viscoelastic glue positioned on a surface of the first constraining layer of material, and a first layer of material having a first composition positioned on a surface of the first layer of viscoelastic glue;
 securing the first laminar panel to the support structure;
 providing a second laminar panel which comprises a second constraining layer of material, a second layer of viscoelastic glue positioned on a surface of the second constraining layer of material, and a second layer of material having a second composition which is different than the first composition; and
 securing the second laminar panel to the support structure; and further wherein said first and second layers of viscoelastic glue comprise a minimum of 33% up to a maximum of 65% acrylate polymer, by weight.

* * * * *